United States Patent
O'Hagan et al.

(10) Patent No.: US 11,465,810 B2
(45) Date of Patent: Oct. 11, 2022

(54) PACKAGE HAVING PEEL RESEAL FEATURE

(71) Applicant: Bemis Company, Inc., Neenah, WI (US)

(72) Inventors: Brian R. O'Hagan, Appleton, WI (US); Jordan R. Tracy, Menasha, WI (US)

(73) Assignee: BEMIS COMPANY, INC., Neenah, WI (US)

( * ) Notice: Subject to any disclaimer, the term of this patent is extended or adjusted under 35 U.S.C. 154(b) by 65 days.

(21) Appl. No.: 16/497,077

(22) PCT Filed: May 8, 2017

(86) PCT No.: PCT/US2017/031541
§ 371 (c)(1),
(2) Date: Sep. 24, 2019

(87) PCT Pub. No.: WO2018/208279
PCT Pub. Date: Nov. 15, 2018

(65) Prior Publication Data
US 2021/0171243 A1 Jun. 10, 2021

(51) Int. Cl.
*B65D 33/20* (2006.01)
*B65D 75/58* (2006.01)
*B32B 27/08* (2006.01)

(52) U.S. Cl.
CPC ......... *B65D 33/20* (2013.01); *B65D 75/5805* (2013.01); *B32B 27/08* (2013.01);
(Continued)

(58) Field of Classification Search
CPC ................ B65D 33/20; B65D 75/5805; B65D 75/5855; B65D 2575/586
(Continued)

(56) References Cited

U.S. PATENT DOCUMENTS 3,329,331 A 7/1967 Morgan
4,543,139 A 9/1985 Freedman et al.
(Continued)

FOREIGN PATENT DOCUMENTS

EP 0661154 B1 11/1997
EP 1077186 B1 4/2005
(Continued)

OTHER PUBLICATIONS

Machine translation of WO-2013182689-A1.*
Machine translation of JP-06312751-A.*

*Primary Examiner* — Jes F Pascua

(57) ABSTRACT

A package is described. The package comprises a first wall, a second wall, and a first seal. The first wall comprises an exterior layer, an interior layer, and a peelable adhesive layer positioned between the exterior layer and the interior layer. The interior layer comprises a first Sine of weakness and a second Sine of weakness, and the peelable adhesive layer comprises a peelable adhesive region and a first void. The first void is aligned with the first Sine of weakness. The first seal is positioned between the first line of weakness and the second line of weakness, and a first end portion of the first seal is aligned with the first void. Various embodiments of the package are also described.

17 Claims, 11 Drawing Sheets

(52) U.S. Cl.
CPC .. *B32B 2307/7244* (2013.01); *B65D 75/5855* (2013.01); *B65D 2575/586* (2013.01)

(58) Field of Classification Search
USPC .................................................. 383/210, 211
See application file for complete search history.

(56) References Cited

U.S. PATENT DOCUMENTS

| | | |
|---|---|---|
| 5,089,320 A | 2/1992 | Straus et al. |
| 5,382,472 A | 1/1995 | Yanidis et al. |
| 5,965,254 A | 10/1999 | Christopherson et al. |
| 6,056,141 A | 5/2000 | Navarini et al. |
| 6,076,969 A | 6/2000 | Jaisle et al. |
| 6,461,044 B1 | 10/2002 | Anderson |
| 7,422,782 B2 | 9/2008 | Haedt et al. |
| 7,527,839 B2 | 5/2009 | Busche et al. |
| 7,608,317 B2 | 10/2009 | Keckeisen et al. |
| 8,091,323 B2 | 1/2012 | Paterson |
| 8,256,636 B2 | 9/2012 | Huffer |
| 8,354,132 B2 | 1/2013 | Stephens et al. |
| 8,617,677 B2 | 12/2013 | Trouilhet et al. |
| 2003/0228077 A1 | 12/2003 | Laske |
| 2009/0252912 A1 | 10/2009 | Yasuike |
| 2010/0247003 A1* | 9/2010 | Huffer ................ B65D 75/5855 383/207 |
| 2013/0121624 A1 | 5/2013 | Lyzenga et al. |
| 2014/0361013 A1 | 12/2014 | Perick et al. |
| 2016/0311598 A1 | 10/2016 | O'Hagan et al. |
| 2017/0240331 A1* | 8/2017 | Huffer .................... B32B 27/32 |
| 2018/0079575 A1* | 3/2018 | Down ................ B65D 75/5838 |

FOREIGN PATENT DOCUMENTS

| | | | | |
|---|---|---|---|---|
| EP | 2067717 A1 | | 6/2009 | |
| EP | 2716566 A1 | * | 4/2014 | ......... B65D 75/5855 |
| FR | 2783512 A1 | | 3/2000 | |
| JP | 06312751 A | * | 11/1994 | |
| WO | WO-2013182689 A1 | * | 12/2013 | .............. B32B 5/00 |
| WO | 2015002651 A1 | | 1/2015 | |
| WO | 2016053241 A1 | | 4/2016 | |
| WO | 2016159928 A1 | | 10/2016 | |

* cited by examiner

PACKAGE HAVING PEEL RESEAL FEATURE

The present application describes a package having a peel reseal feature. More specifically, the present application describes a package having a first wall, a second wall, and a first seal and a particular relationship between the first wall components and the first seal to create the peel reseal feature.

BACKGROUND

Certain products are packaged to allow for repeated access to the product. Packaging having zipper reclose mechanisms are often employed for packaging products in situations where the consumer may wish to remove only a portion of the product and reclose the package. One problem with zippers is that applying zippers to a film roll makes the film roll bulky and more difficult to handle. Additionally, even though zippers can be applied in high-speed in-line operations, equipment requirements for applying zippers and the expense of the zipper materials can be significant. Other mechanical closures can be applied in in-line operations. But these often require complex manufacturing to apply, interconnect, and align the mechanical closure features. In general, separate (as contrasted to integrated) mechanical reclosable or resealable fasteners often add undue complexity, cost, and expense to package manufacture.

In addition, separate mechanical closures may not provide hermetic seals when desired, and some end-users may have difficulty operating and manipulating separate mechanical closures.

International Application Publication WO 2016/159928 (O'Hagan) discloses a flexible peelable resealable package having a first wall with an abuse layer, a printed release lacquer, a pressure sensitive adhesive, and a sealant substrate. The first wall further has at least one score aligned with the release lacquer and the pressure sensitive adhesive. This package requires a heat seal positioned over release lacquer. Additionally, this package includes release lacquer and pressure sensitive adhesive in the side seals. As a result, the package may be prone to seal failures or leakers.

SUMMARY

What is needed is a peel reseal package with an integrated closure mechanism that is easy to manufacture, that is easy to use and open, and that does not leak either initially or after reclose. These needs are met by the package described in the present application.

In a first set of embodiments, this package comprises a first wall, a second wall, and a first seal. The first wall comprises an exterior layer, an interior layer, and a peelable adhesive layer positioned between the exterior layer and the interior layer. The interior layer comprises a first line of weakness and a second line of weakness. In some embodiments each of the first line of weakness and the second line of weakness is linear and the first line of weakness is parallel to the second line of weakness. In other embodiments, each of the first line of weakness and the second line of weakness comprises a continuous series of perforations.

In the first set of embodiments, the peelable adhesive layer comprises a peelable adhesive region and a first void. The first void is aligned with the first line of weakness. The first seal is positioned between the first line of weakness and the second line of weakness, and a first end portion of the first seal is aligned with the first void. In some embodiments, the first seal comprises a first border and a second border, and the first border is positioned a distance of from 0 to 6.35 millimeters from the first line of weakness.

In some of the embodiments of the first set of embodiments, the package further comprises a first edge, a second edge opposing the first edge, a third edge substantially perpendicular to the first edge and the second edge, and a fourth edge opposing the third edge.

In some of these embodiments, the first seal connects the first wall to the second wall, is adjacent the fourth edge, and extends from the first edge to the second edge. And in some of these embodiments, the first edge comprises a first edge seal, the second edge comprises a second edge seal, the third edge comprises a fold or a formed gusset, and the peelable adhesive region is absent from each of the first edge seal and the second edge seal.

In yet other of these embodiments, the first wall and the second wall are formed from a sheet having a sheet first side and an opposing sheet second side; a second seal comprising a fin seal, a lap seal, a butt-seal tape, or a seal strip connects the sheet first side to the sheet second side; the first edge comprises a fold or a formed gusset, the second edge comprises a fold or a formed gusset, and the third edge comprises a third edge seal or an inserted gusset; and each of the first line of weakness and the second line of weakness is absent from each of the first edge and the second edge. Further, in some of these embodiments, at least one of the first line of weakness and the second line of weakness may be non-linear, a first end of the first line of weakness may connect to a first end of the second line of weakness, and a second end of the first line of weakness may connect to a second end of the second line of weakness. In yet other of these embodiments, each of the first line of weakness and the second line of weakness may be linear, the first line of weakness may be parallel to the second line of weakness, a third line of weakness may connect the first line of weakness to the second line of weakness, and a fourth line of weakness may connect the first line of weakness to the second line of weakness In some embodiments of the first set of embodiments, the first wall and the second wall are formed from a sheet having a sheet first side and an opposing sheet second side. The first seal comprises a fin seal, a lap seal, a butt-seal tape, or a seal strip, connects the sheet first side to the sheet second side, and extends from the third edge to the fourth edge. In some of these embodiments, the first edge comprises a fold or formed gusset, the second edge comprises a fold or formed gusset, the third edge comprises a third edge seal or an inserted gusset, and the fourth edge comprises a fourth edge seal or an inserted gusset.

In some embodiments of the first set of embodiments, the first wall further comprises (a) a release layer comprising a release agent region positioned between the exterior layer and the peelable adhesive layer and positioned between the first line of weakness and the second line of weakness and (b) a permanent adhesive layer positioned between the peelable adhesive layer and the interior layer and comprising a permanent adhesive region and a second void. The second void is aligned with the first void and the first line of weakness, and the first end portion of the first seal is aligned with the first void and the second void. In some of these embodiments, the release agent region is coextensive with a region between the first line of weakness and the second line of weakness or the release agent region is at least as wide as the peelable adhesive region. In yet other of these embodiments, the package further comprises a first edge, a second edge opposing the first edge, a third edge substantially perpendicular to the first edge and the second edge, and a fourth edge opposing the third edge; the first seal connects the first wall to the second wall and is adjacent the fourth edge; the first edge comprises a first edge seal, the second edge comprises a second edge seal, and the third edge comprises a fold or a formed gusset; and each of the peelable adhesive region and the release agent region is absent from each of the first edge seal and the second edge seal.

In a second set of embodiments, the package comprises a first wall, a second wall, a first edge seal, a second edge seal opposing the first edge, a third edge fold substantially perpendicular to the first edge and the second edge, a fourth edge opposing the third edge fold, and a first seal. The first wall comprises an exterior layer, an interior layer, a peelable adhesive layer positioned between the exterior layer and the interior layer, a release layer comprising a release agent region positioned between the exterior layer and the peelable adhesive layer, and a permanent adhesive layer positioned between the peelable adhesive layer and the interior layer. The interior layer comprises a first line of weakness and a second line of weakness. Each of the first line of weakness and the second line of weakness is linear, and the first line of weakness is parallel to the second line of weakness. The peelable adhesive layer comprises a peelable adhesive region and a first void. The release agent region is positioned between the first line of weakness and the second line of weakness and is coextensive with a region between the first line of weakness and the second line of weakness. The permanent adhesive layer comprises a permanent adhesive region and a second void. The second void is aligned with the first void, and each of the first void and the second void is aligned with the first line of weakness. The first seal connects the first wall to the second wall, is adjacent the fourth edge. extends from the first edge to the second edge, and is positioned between the first line of weakness and the second line of weakness with a first end portion of the first seal aligned with the first void and the second void. The release agent region is at least as wide as the peelable adhesive region, and each of the peelable adhesive region and the release agent region is absent from each of the first edge seal and the second edge seal.

In some embodiments of the second set of embodiments, the first seal comprises a first border and a second border, and the first border is positioned a distance of from 0 to 6.35 millimeters from the first line of weakness.

In some embodiments of the second set of embodiments, each of the first line of weakness and the second line of weakness comprises a continuous series of perforations.

DETAILED DESCRIPTION

Figure 1:
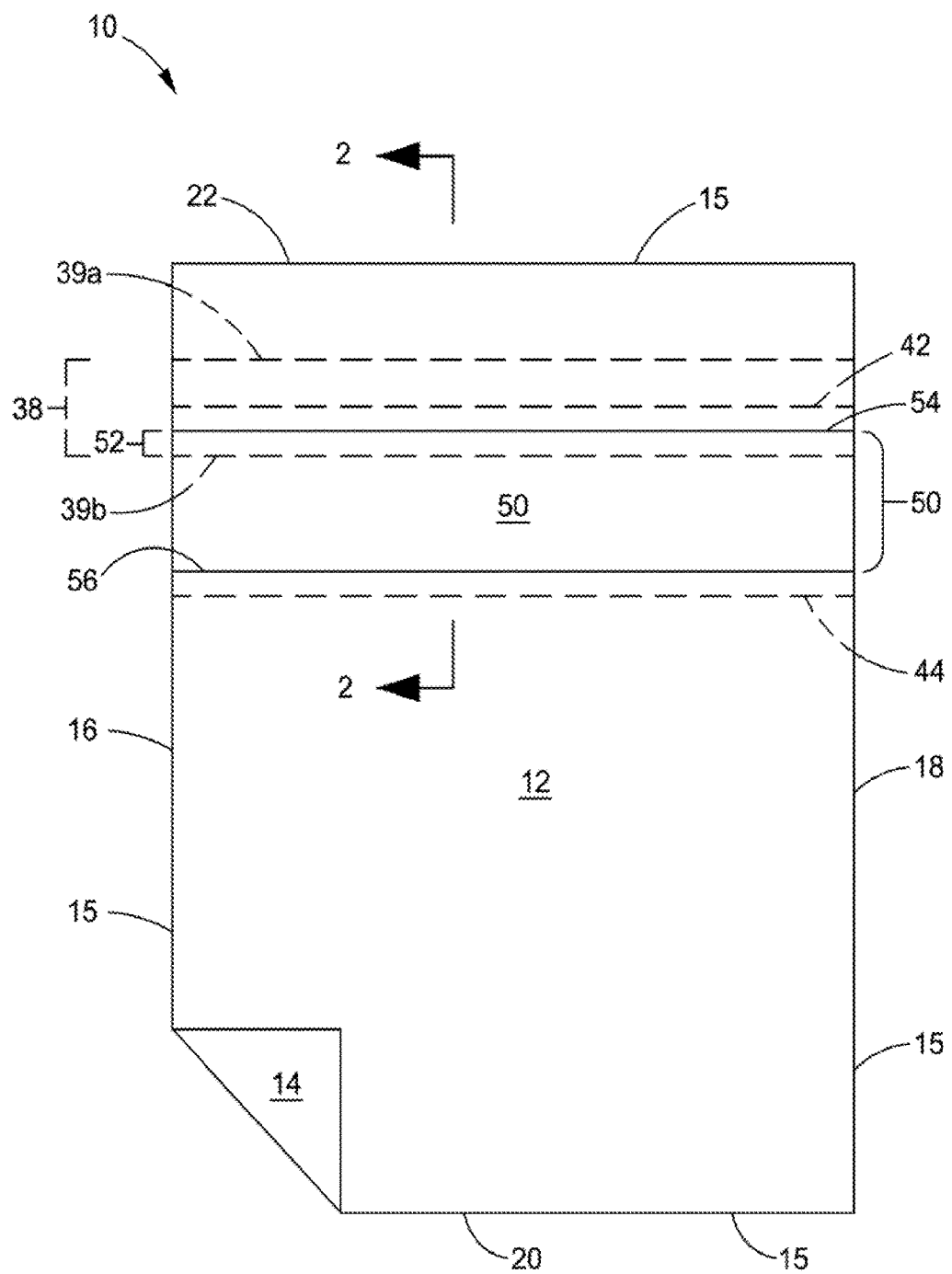
FIG. 1 is a schematic top view of a first embodiment of a package according to the present application.
Figure 2:
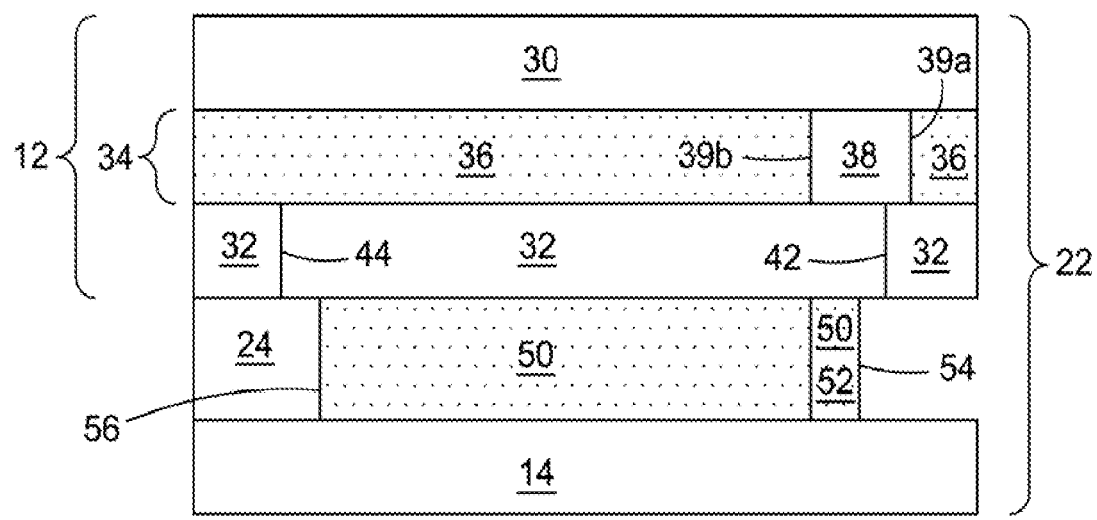
FIG. 2 is a schematic cross-sectional view of the package of FIG. 1, taken along the line 2-2.

Referring to the drawings, with some but not all embodiments shown, with elements depicted as illustrative and not necessarily to scale, and with the same (or similar) reference numbers denoting the same (or similar) features throughout the drawings, FIG. 1 is a schematic top view of a first embodiment of a package according to the present application. FIG. 2 is a schematic cross-sectional view of the package of FIG. 1, taken along the line 2-2. As depicted in FIG. 1, package 10 is a sealed package with an up-turned corner. Package 10 comprises first wall 12 and second wall 14. FIG. 1 depicts first wall 12 facing out and second wall 14 facing in. Package 10 further comprises perimeter 15 comprising first edge 16, second edge 18 opposing first edge 16, third edge 20 substantially perpendicular to first edge 16 and second edge 18, and fourth edge 22 opposing third edge 20. (As used throughout this application, the term "substantially" refers to being for the most part, primarily, principally, predominantly, chiefly, mainly, mostly, or generally. A property this is "substantially" may not be completely, fully, perfectly, thoroughly, totally, or wholly. For example, the angle at which third edge 20 intersects first edge 16 or second edge 18 may be equal to 90 degrees or may be slightly less than or slightly greater than 90 degrees.) Package 10 with first wall 12, second wall 14, and perimeter 15 is configured to fully enclose product space 24 (see, e.g., FIGS. 2 and 14).

In some embodiments, perimeter 15 may be other than four-sided (e.g., 3-sided, 5-sided, 6-sided, etc.), and the intersection of first edge 16, third edge 20, second edge 18, and fourth edge 22 may not be at distinct corners. In such embodiments, first edge 16, second edge 18, third edge 20, and fourth edge 22 have relative positions, but not necessarily exact positions, as described in the present application.

The configuration for package 10 may be any one of a variety known in the packaging arts. As such, possible packaging configurations include but are not limited to horizontal-form-fill-seal package, vertical form-fill-seal package, lap-seal package, fin-seal package, quad-seal package, three-side-seal package, quad-pack, pouch, stand-up pouch, K-seal pouch, doyen-style pouch, side-gusset pouch, pillow pouch, stick pack, sachet, forming/non-forming package, thermoformed tray with lid, or other packaging configurations known in the packaging arts. With the various packaging configurations, first edge 16, second edge 18, third edge 20, and fourth edge 22 may take various forms. Such forms include but are not limited to a seal (e.g., an ultrasonic seal, a heat seal, a pressure seal or other seal known in the packaging arts) connecting first wall 12 to second wall 14, a fold between and connecting first wall 12 to second wall 14, a gusset member formed or plowed in a fold between and connecting first wall 12 to second wall 14, a gusset member inserted and sealed between and connecting first wall 12 to second wall 14, other sealing or connecting forms or means known in the packaging arts, or combinations of the above.

In some embodiments, the various packages of the present application may further comprise a header or a header seal.

The header or header seal may comprise a hanger hole, perforation, card, or other device to facilitate display or other marketing of the product. In such embodiments, an end-user first removes the header or header seal to access the product space and the peel reseal feature described in the present application, As depicted in FIG. 2, first wall 12 comprises exterior layer 30, interior layer 32, and peelable adhesive layer 34 positioned between exterior layer 30 and interior layer 32. As used throughout this application, the term "exterior" refers to a relative position closer to the outermost surface of a film, sheet, web, package or other article. The term "interior" refers to a relative position closer to the innermost surface of a film, sheet, web, package or other article. Accordingly, the term "exterior layer" refers to a layer comprising the outermost surface of a film, sheet, web, package, or other article. The term "interior layer" refers to a layer comprising the innermost surface of a film, sheet, web, package, or other article. Additionally, the exterior layer and the interior layer each have an inner surface and an outer surface. The term "inner surface" refers to a surface touching another layer, and the term "outer surface" refers to a surface not touching another layer.

In some embodiments, exterior layer 30 may be an abuse layer. In such embodiments, exterior layer 30 may comprise any thermoplastic, paper, or non-woven material known in the packaging arts as abuse-resistant. Non-limiting examples of such thermoplastic materials are polyethylene, polypropylene (including but not limited to biaxially oriented polypropylene), polyester (including but not limited to biaxially oriented polyester), polyamide (including but not limited to biaxially oriented polyamide), or combinations of the above. In some embodiments, exterior layer 30 may have a thickness of from 12 micron to 36 micron (i.e., from 48 gauge to 142 gauge).

In some embodiments, interior layer 32 may be a sealant film. As used throughout this application, the term "sealant film" refers to a film included in a package film and involved in the sealing of the package film to itself or to another layer of another film, sheet, etc. A sealant film may be monolayer or multilayer. The term "sealant layer" refers to the specific layer of the sealant film involved in the sealing to itself or to another layer. If the sealant film is monolayer, the sealant film is synonymous with the sealant layer. If the sealant film is multilayer layer, the sealant film comprises a sealant layer as the interior layer of the sealant film. As used throughout this application, the term "interior layer of the sealant film" refers to the layer of the sealant film that is closer to the innermost surface of a film, sheet, web, package, or other article; it is the layer of the sealant film directly adjacent package contents.

The sealant film may be acquired or produced by means known in the packaging arts (such as, for example, blown film extrusion or co-extrusion, slot cast extrusion or co-extrusion, lamination, coating, etc.). A sealant film may comprise, but is not limited to comprising, ionomer, medium density polyethylene, low density polyethylene, ethylene alpha-olefin copolymer, ethylene vinyl acetate, ethylene acrylate copolymer, ethylene acid copolymer, polypropylene, or blends of any of the above. In some embodiments, a multilayer sealant film may comprise a sealant layer including one or more of the preceding materials and various other layers comprising polyolefin, tie material, oxygen barrier material, or blends of such. In some embodiments, interior layer 32 (as a multilayer sealant film) may have a thickness of from less than 12 micron to greater than 76 micron (i.e., of from less than 0.5 mil to greater than 3 mil).

As used throughout this application, the term "polyethylene" or "PE" refers (unless indicated otherwise) to ethylene homopolymers or copolymers. Such copolymers of ethylene include copolymers of ethylene with at least one alpha-olefin and copolymers of ethylene with other units or groups such as vinyl acetate, acid groups, acrylate groups, or otherwise. The term "polyethylene" or "PE" is used without regard to the presence or absence of substituent branch groups. PE includes, for example, medium density polyethylene, high density polyethylene, low density polyethylene, ethylene alpha-olefin copolymer, ethylene vinyl acetate, ethylene acid copolymers, ethylene acrylate copolymers, or blends of such. Various PE's may be recycled as reclaimed PE.

As used throughout this application, the term "high density polyethylene" or "HDPE" refers to both (a) homopolymers of ethylene which have densities from 0.960 g/cm$^3$ to 0,970 g/cm$^3$ and (b) copolymers of ethylene and an alpha-olefin (usually 1-butene or 1-hexene) which have densities from 0.940 g/cm$^3$ to 0.958 g/cm$^3$. HDPE includes polymers made with Ziegler or Phillips type catalysts and polymers made with single-site metallocene catalysts. HDPE also includes high molecular weight polyethylenes.

As used throughout this application, the term "low density polyethylene" or "LDPE" refers to branched homopolymers having densities from 0.915 g/cm$^3$ to 0.930 g/cm$^3$, as well as copolymers containing polar groups resulting from copolymerization (such as with vinyl acetate or ethyl acrylate). LDPE may contain long branches off the main chain (often termed "backbone") with alkyl substituents of two to eight carbon atoms.

As used throughout this application, the terms "copolymer of ethylene and at least one alpha-olefin" or "ethylene alpha-olefin copolymer" refer to a modified or unmodified copolymer produced by the co-polymerization of ethylene and any one or more alpha-olefins. Suitable alpha-olefins include, for example, $C_3$ to $C_{20}$ alpha-olefins such as 1-propene, 1-butene, 1-pentene, 1-hexene, 1-octene, 1-decene, and blends of such. The co-polymerization of ethylene and an alpha-olefin may be produced by heterogeneous catalysis, such as co-polymerization reactions with Ziegler-Natta catalysis systems, including, for example, metal halides activated by an organometallic catalyst (e.g., titanium chloride) and optionally containing magnesium chloride complexed to trialkyl aluminum. Alternatively, the co-polymerization of ethylene and an alpha-olefin may be produced by homogeneous catalysis, such as co-polymerization reactions with metallocene catalysis systems which include constrained geometry catalysts, (e.g., monocyclopentadienyl transition-metal complexes). Homogeneous catalyzed copolymers of ethylene and alpha-olefin may include modified or unmodified ethylene alpha-olefin copolymers having a long-chain branched (i.e., 8-20 pendant carbons atoms) alpha-olefin co-monomer (commercially available as, for example, Affinity™ from The Dow Chemical Company (Midland, Mich.)), linear copolymers (commercially available as, for example, Tafmer™ from the Mitsui Petrochemical Corporation (Tokyo, Japan)), and modified or unmodified ethylene alpha-olefin copolymers having a short-chain branched (i.e., 3-6 pendant carbons atoms) alpha-olefin co-monomer (commercially available as, for example, Exact™ from Exxon-Mobil Chemical Company (Houston, Tex.)). Ethylene alpha-olefin copolymers may include, for example, linear low density polyethylene (LLDPE), metallocene-catalyzed LLDPE (mLLDPE), very low density polyethylene (VLDPE), metallocene-catalyzed VLDPE (mVLDPE), and ultra low density polyethylene (ULDPE).

As used throughout this application, the term "ethylene vinyl acetate" or "EVA" refers to copolymers comprised of repeating units of ethylene and vinyl acetate. Ethylene vinyl acetate copolymers may be represented by the general formula: $[(CH_2-CH_2)_n-(CH_2-CH(COO)(CH_3)]_{n'}$. The vinyl acetate content may vary from less than 10% to greater than 95% by weight (of total EVA composition). The vinyl acetate content of EVA for packaging applications may vary from 5% to 40% by weight.

As used throughout this application, the term "ethylene acrylate copolymers" refers to copolymers comprised of repeating units of ethylene and acrylate groups. The acrylate group may be butyl-, ethyl-, methyl-, or otherwise. Non-limiting examples of ethylene acrylate copolymers include ethylene methyl acrylate (EMA) and ethylene methyl methacrylate (EMMA).

As used throughout this application, the term "ethylene acid copolymers" refers to copolymers comprised of repeating units of ethylene and acid groups. The acid group content may vary from 2% to 25% by weight. Non-limiting examples of ethylene acid copolymers include ethylene methacrylic acid (EMAA) and ethylene acrylic acid (EAA).

As used throughout this application, the term "polypropylene" or "PP" refers to a plastomer, homopolymer or copolymer having at least one propylene monomer linkage within the repeating backbone of the polymer. The propylene linkage may be represented by the general formula: $[CH_2-CH(CH_3)]_n$. Such polypropylene may be a polypropylene impact copolymer, a polypropylene random copolymer, or a polypropylene homopolymer, may be syndiotactic or isotactic, or may or may not be clarified.

As used throughout this application, the term "polyester" refers to a homopolymer or copolymer having an ester linkage between monomer units. The ester linkage may be represented by the general formula $[O-R-OC(O)-R'-C(O)]_n$ where R and R' are the same or different alkyl (or aryl) group and may generally be formed from the polymerization of dicarboxylic acid and diol monomers. The dicarboxylic acid (including the carboxylic acid moieties) may be linear or aliphatic (e.g., oxalic acid, maleic acid, succinic acid, glutaric acid, adipic acid, pimelic acid, suberic acid, azelaic acid, sebacic acid, and the like) or may be aromatic or alkyl substituted aromatic (e.g., various isomers of phthalic acid, such as paraphthalic acid (or terephthalic acid), isophthalic acid, and naphthalic acid). Specific examples of a useful diol include but are not limited to ethylene glycol, propylene glycol, trimethylene glycol, 1,4-butane diol, neopentyl glycol, cyclohexane diol, 2,2,4,4-tetramethyl-1,3-cyclobutanediol, and the like. Polyesters may include a homopolymer or copolymer of alkyl-aromatic esters, including but not limited to polyethylene terephthalate (PET), oriented polyethylene terephthalate (OPET), amorphous polyethylene terephthalate (APET), glycol-modified polyethylene terephthalate (PETG), and polybutylene terephthalate (PBT); a copolymer of terephthalate and isophthalate including but not limited to polyethylene terephthalate/isophthalate copolymer, such as isophthalic acid (IPA) (modified polyethylene terephthalate (PETI)); a homopolymer or copolymer of aliphatic esters including but not limited to polylactic acid (PLA); polyhydroxyalkonates including but not limited to polyhydroxypropionate, poly(3-hydroxybutyrate) (PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoate) (PH6); and blends of any of these materials.

As used throughout this application, the term "polyamide" or PA or "nylon" refers to a homopolymer or copolymer having an amide linkage between monomer units and formed by any method known in the packaging arts. The amide linkage may be represented by the general formula: $[C(O)-R-C(O)-NH-R'-NH]_n$ where R and R' are the same or different alkyl (or aryl) group. Nylon polymers may be high-temperature, low-temperature or amorphous, as described in, for example. International Application Publication WO 2006/063283. Examples of nylon polymers include but are not limited to nylon 6 (polycaprolactam), nylon 11 (polyundecanolactam), nylon 12 (polyaurylactam), nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 7,7 (polyheptamethylene pimelamide), nylon 8,8 (polyoctamethylene suberamide), nylon 9,9 (polynonamethylene azelamide), nylon 10,9 (polydecamethylene azelamide), and nylon 12,12 (polydodecamethylene dodecanediamide). Examples of nylon copolymers include but are not limited to nylon 6,6/6 copolymer (polyhexamethylene adipamide/caprolactam copolymer), nylon 6,6/9 copolymer (polyhexamethylene adipamide/azelamide copolymer), nylon 6/6,6 copolymer (polycaprolactam/hexamethylene adipamide copolymer), nylon 6,2/6,2 copolymer (polyhexamethylene ethylenediamide/hexamethylene ethylenediamide copolymer), and nylon 6,6/6,916 copolymer (polyhexamethylene adipamide/hexamethylene azelamide/caprolactam copolymer). Examples of aromatic nylon polymers (also sometimes referred to as "amorphous polyamide" or "amorphous nylon") include but are not limited to nylon 4,1, nylon 6,1, nylon 6,6/6I copolymer, nylon 6,6/6T copolymer, nylon MXD6 (poly-m-xylylene adipamide), poly-p-xylylene adipamide, nylon 6I/6T copolymer, nylon 6T/6I copolymer, nylon MXDI, nylon 6/MXDT/copolymer, nylon 6T (polyhexamethylene terephthalamide), nylon 12T (polydodecamethylene terephthalamide), nylon 6T, and nylon 6-3-T (poly (trimethyl hexamethylene terephthalamide).

As used throughout this application, "ionomer" refers to ionic copolymers formed from an olefin and an ethylenically unsaturated monocarboxylic acid having the carboxylic acid moieties partially or completely neutralized by a metal ion. Suitable metal ions may include, but are not limited to, sodium, potassium, lithium cesium, nickel, and zinc. Suitable carboxylic acid comonomers may include, but are not limited to, ethylene acid copolymers, such as, ethylene methacrylic acid, methylene succinic acid, maleic anhydride, vinyl acetate methacrylic acid, methyl methacrylate methacrylic acid, styrene methacrylic acid, and blends of such. Useful ionomer ethylene/acid copolymer resins may include an olefinic content of at least 50 mole percent based upon the copolymer and a carboxylic acid content of from 5 to 25 mole percent based upon the copolymer.

As used throughout this application, the term "polyolefin" (or "polyalkene") refers to any class of polymers produced from an alkene (or "olefin") with the general formula $C_nH_{2n}$. Non-limiting examples of polyolefins are polyethylenes and polypropylenes.

As used throughout this application, the term "tie material" or "tie" refers to a polymeric material serving a primary purpose or function of adhering two surfaces to one another, such as the planar surfaces of two film layers. For example, a tie material adheres one film surface to another film layer surface or one area of a film layer surface to another area of a film layer surface. Tie material may comprise any polymer, copolymer, or blend of polymers having a polar group or any other polymer, homopolymer, copolymer, or blend of polymers, including modified and unmodified polymers (such as grafted copolymers) which provide sufficient interlayer adhesion to adjacent layers comprising otherwise non-adhering polymers. Tie material may comprise but is not limited to peelable adhesive and permanent adhesive, As used throughout this application, the term "oxygen barrier material" includes but is not limited to polyamide, ethylene vinyl alcohol copolymer, polyvinylidene chloride, or blends of such.

As used throughout this application, the term "ethylene vinyl alcohol copolymer" or "EVOH" refers to copolymers comprised of repeating units of ethylene and vinyl alcohol. Ethylene vinyl alcohol copolymers may be represented by the general formula: $[(CH_2\text{---}CH_2)_n\text{---}(CH_2\text{---}CH(OH))]_n$. Ethylene vinyl alcohol copolymers may include saponified or hydrolyzed ethylene vinyl acetate copolymers. EVOH refers to a vinyl alcohol copolymer having an ethylene co-monomer and prepared by, for example, hydrolysis of vinyl acetate copolymers or by chemical reactions with vinyl alcohol. Ethylene vinyl alcohol copolymers may comprise from 28 mole percent (or less) to 48 mole percent (or greater) ethylene.

As used throughout this application, the term "polyvinylidene chloride" or "PVdC" refers to a homopolymer or copolymer having at least one vinylidene chloride monomer linkage within the repeating backbone of the polymer. The vinylidene chloride linkage may be represented by the general formula $[CH_2\text{---}CCl_2]_n$. As a copolymer, PVdC may have a major amount of vinylidene chloride and a minor amount of one or more monomers such as vinyl chloride or alkyl acrylates (such as methyl acrylates).

As used throughout this application, the term "copolymer" refers to a polymer product obtained by the polymerization reaction or copolymerization of at least two monomer species. Copolymers may also be referred to as bipolymers. The term "copolymer" is also inclusive of the polymerization reaction of three, four, or more monomer species having reaction products referred to terpolymers, quaterpolymers, etc.

As used throughout this application, the term "modified" refers to a chemical derivative, such as one having any form of anhydride functionality (e.g., anhydride of maleic acid, crotonic acid, citraconic acid, itaconic acid, fumaric acid, etc.), whether grafted onto a polymer, copolymerized with a polymer or blended with one or more polymers. The term is also inclusive of derivatives of such functionalities, such as acids, esters, and metal salts derived from such.

As used throughout this application, the term "thermoplastic" refers to a polymer or polymer mixture that softens when exposed to heat and then returns to its original condition when cooled to room temperature.

As used throughout this application, the term "film" refers to a thermoplastic web of any thickness and is not limited to a thermoplastic web having a thickness of less than 250 micron (i.e., 10 mil). The term "sheet" refers to a thermoplastic web of any thickness and is not limited to a thermoplastic web having a thickness of greater than 10 mil (i.e., 10 mil).

Returning to the figures, in the various embodiments described in the present application, second wall 14 may monolayer or multilayer and may comprise any of the materials described above for the exterior layer 30 of first wall 12 or the interior layer 32 of first wall 12. As a multilayer film, second wall 14 may comprise the same or different exterior layer and interior layer as first wall 12.

Returning to FIGS. 1 and 2, interior layer 32 comprises first line of weakness 42 and second line of weakness 44. As used throughout this application, a "line of weakness" refers to a continuous or non-continuous zone of first wall 12 that facilitates opening of package 10. In the various embodiments, a line of weakness may comprise a series of scores, holes, vents, slits, slots, perforations, notches, punctures, orifices, openings, inlets, channels, etc., in the surface of or through a layer or may comprise a zone of an easy-tear material, such as an easy-tear sealant film. In some embodiments, first line of weakness 42 and second line of weakness 44 each comprises a continuous series of perforations. As a series of perforations, in some embodiments, the first line of weakness, the second line of weakness, or both may provide an audible, tearing-type sound opening open or otherwise function as tamper-evidence feature(s).

As a series of scores, holes, vents, slits, slots, perforations, notches, punctures, orifices, openings, inlets, channels, etc, in the surface of or through a layer, a line of weakness may have varying depths. Its depth may extend from the outer surface of the interior layer to the inner surface of the interior layer (i.e., throughout the entire thickness of the interior layer). Alternatively, its depth may extend throughout the entire thickness of the interior layer and into the thickness of the peelable adhesive layer. Further alternatively, its depth may extend from 50% to 95% of the thickness of the interior layer. A line of weakness as a series of scores, holes, vents, slits, slots, perforations, notches, punctures, orifices, openings, inlets, channels, etc., may be formed by mechanical means (e.g., using a cutting blade), by chemical means (e.g., using solvents), by thermal means (e.g., by optical ablation), or by other means known in the packaging arts. As used throughout this application, the term "optical ablation" refers to a method of localized vaporization or decomposition of polymeric material by means of a controlled laser beam which may be used to form an aperture in a thermoplastic material.

As depicted in FIGS. 1 and 2, each of first line of weakness 42 and second line of weakness 44 is linear, and first line of weakness 42 is parallel to second line of weakness 44. As used throughout this application, the term "linear" refers to a shape or geometry that is of, relating to, denoting or involving a straight line substantially throughout, traced by a point traversing in a constant direction or a line having an equation that may be written in slope-intercept form y=mx+b, where "m" is the slope and "b" is the y-intercept. In other embodiments, each of the first line of weakness and the second line of weakness is linear but not necessarily parallel to one another.

In other embodiments, at least one of the first line of weakness and the second line of weakness is non-linear. As used throughout this application, the term "non-linear" refers to a shape or geometry that is not a straight line substantially throughout, such that it has at least two dimensions and is traced by a point traversing in at least two directions. Non-limiting examples of non-linear shape include curved or arcuate, v-shaped, inverted v-shaped, w-shaped, or inverted w-shaped (or m-shaped).

In some embodiments, interior layer 32 may comprise multiple lines of weakness (in other words, more than two lines of weakness). As further described below, in such embodiments, the first seal is still positioned between at least two of the lines of weakness, one as a first line of weakness and the other as a second line of weakness, and the first line of weakness is aligned with/overlays the first void.

Peelable adhesive layer 34 comprises peelable adhesive region 36 and first void 38 (having first void first border 39a and first void second border 39b). Peelable adhesive region 36 comprises a peelable adhesive. Peelable adhesives are designed to form temporary bonds and can be removed after hours, days, months, or years. Some peelable adhesives are designed to repeatedly separate and reattach. A non-limiting example of a peelable adhesive is a pressure sensitive adhesive. Non-limiting examples of pressure sensitive adhesives include but are not limited to those compositions that comprise a base elastomeric resin and a tackifier to enhance the ability of the adhesive to instantly bond and to enhance the bond strength. Examples of elastomers used as the base resin in tackified multicomponent pressure sensitive adhesives include but are not limited to natural rubber; polybutadiene; polyorganosiloxanes; styrene-butadiene rubber; carboyxlated styrene-butadiene rubber; polyisobutylene; butyl rubber; halogenated butyl rubber; block polymers based on styrene with isoprene, butadiene, ethylene-propylene, or ethylene-butylene; or combinations of such elastomers. (See Yorkgitis, "Adhesive Compounds," Encyclopedia of Polymer Science and Technology, Third Edition, 2003, Volume 1, pp. 256-290 (John Wiley & Sons, Inc., Hoboken, N.J.).)

In some embodiments, first void 38 comprises no material (e.g., a "blank" area). In other embodiments, first void 38 comprises a release agent (e.g., as further described below), a peelable adhesive, or other material with a lower bond strength or less affinity with exterior layer 30 or interior layer 32 than peelable adhesive region 36. In yet other embodiments, first void 38 comprises any other materials facilitating an interruption of peelable adhesive layer 34 and a "deadening" of first void 38 of peelable adhesive layer 34.

In some embodiments, the peelable adhesive region of the peelable adhesive layer may be further pattern-applied, i.e., in addition to being "interrupted" by a first void. As non-limiting example, the peelable adhesive region may be formed as a gradient, with the amount of peelable adhesive applied tapered in varying directions, such as more peelable adhesive applied in an area closer to the first line of weakness and less applied in an area closer to the second line of weakness or vice versa. As further non-limiting examples, to form the peelable adhesive region the peelable adhesive may be applied in a triangle pattern or inverted triangle pattern.

As depicted in FIGS. 1 and 2, first seal 50 is positioned between first line of weakness 42 and second line of weakness 44. First end portion 52 of first seal 50 is aligned with first void 38. With such alignment, first end portion 52 partially overlays first void 38. Additionally, first void 38 is aligned with first line of weakness 42. In other words, first void 38 overlays or is otherwise adjacent to or aligned with first line of weakness 42. As used throughout this application, the term "adjacent" refers to being near, close, contiguous, adjoining, or neighboring in proximity. It includes but is not limited to being reasonably close to or in the vicinity of as well as touching, having a common boundary or having direct contact. In FIG. 1, first void 38, first line of weakness 42, and second line of weakness 44 are depicted as dashed lines since, as depicted in FIG. 2, each is internal to first wall 12 of package 10.

As depicted in FIG. 1, first seal 50 comprises first seal first border 54 and first seal second border 56. In various embodiments, first seal first border 54 may be positioned a distance of from 0 to 12.7 millimeters (i.e., 0 to 0.50 inches) or from 0 to 6.35 millimeters (i.e., 0 to 0.25 inches) or from 0 to 3.18 millimeters (i.e., 0 to 0.125 inches) from first line of weakness 42.

As depicted in the embodiment in FIGS. 1 and 2, first seal 50 connects first wall 12 to second wall 14 and is adjacent fourth edge 22. As further depicted in FIG. 1, first seal 50 extends from first edge 16 to opposing second edge 18.

In some embodiments, such as those in which a package is formed from a single sheet of material, the first edge comprises a first edge seal connecting the first wall to the second wall, the second edge comprises a second edge seal connecting the first wall to the second wall, the third edge comprises a fold between and connecting the first wall to the second wall or the third edge comprises a gusset member formed in a fold between and connecting the first wall to the second wall, and the fourth edge comprises or is otherwise adjacent the first seal. In other embodiments, such as those in which a package is formed from two sheets of material or from a first wall non-forming film and a second wall forming film or from a first wall lidding film and a second wall tray, the first edge comprises a first edge seal connecting the first wall to the second wall, the second edge comprises a second edge seal connecting the first wall to the second wall, the third edge comprises a third edge seal connecting the first wall to the second wall, and the fourth edge comprises the first seal or a fourth edge seal connecting the first wall to the second wall. In such embodiments where each of the edges comprises an edge seal, the first seal is otherwise included in the first wall, such as a separate opening/product access feature or as a fin seal, a lap seal, a butt-seal tape, a seal strip, or other seal configuration as known in the packaging arts.

In embodiments comprising a first edge seal (e.g., a heat seal connecting the first wall to the second wall) and a second edge seal (e.g., a heat seal connecting the first wall to the second wall), the peelable adhesive region may be absent from each of the first edge seal and the second edge seal to reduce the occurrence of edge seal failure or leakers.

Figure 3:
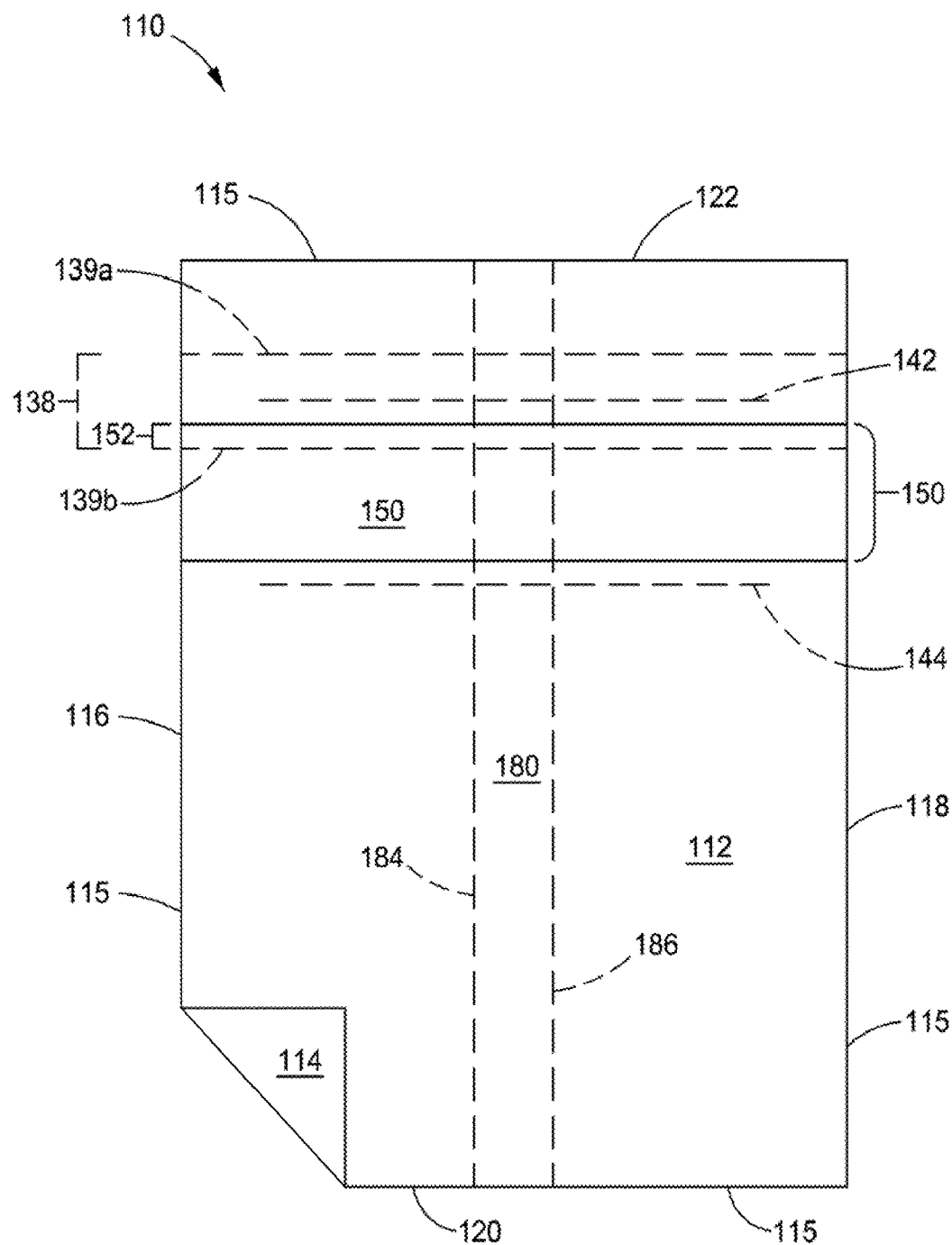
FIG. 3 is a schematic top view of a second embodiment of a package according to the present application.
Figure 4:
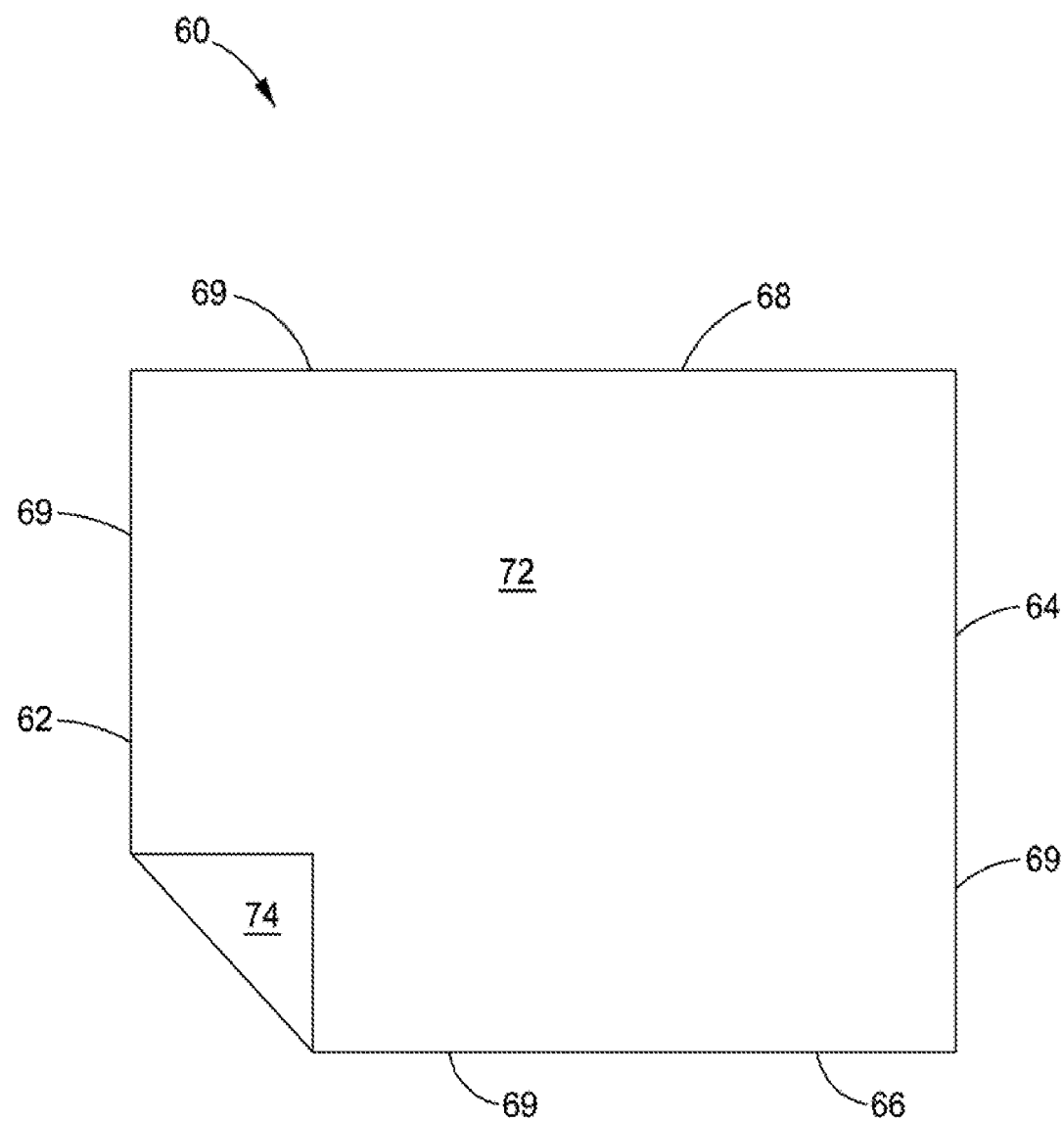
FIG. 4 is a schematic top view of a sheet from which the embodiment of the package of FIG. 3 is formed.

FIG. 3 is a schematic top view of a second embodiment of a package according to the present application. FIG. 4 is a schematic top view of a sheet from which the embodiment of the package of FIG. 3 is formed. As depicted in FIG. 4, sheet 60 has an up-turned corner. Sheet 60 comprises sheet first side 62, sheet second side 84 opposing sheet first side 62, sheet third side 66 substantially perpendicular to sheet first side 62 and sheet second side 64, and sheet fourth side 68 opposing sheet third side 66. Sheet 60 also has a sheet first surface 72 circumscribed by sheet perimeter 69 formed by sheet first side 62, sheet second side 64, sheet third side 66, and sheet fourth side 68 with an opposing sheet second surface 74 also circumscribed by sheet perimeter 69.

Package 110 of FIG. 3 is formed from sheet 60 of FIG. 4. Package 110 is a sealed package with an up-turned corner. Package 110 comprises first wall 112 and second wall 114. FIG. 3 depicts first wall 112 facing out and second wall 114 facing in. Package 110 is formed by connecting sheet first side 62 to sheet second side 64 to form second seal 180 and contiguous second wall 114 (and contiguous first wall 112). In FIG. 3, second seal first border 184 and second seal second border 186 are depicted as dashed lines as they are in second wall 114. Second seal 180 of package 110 comprises a fin seal, a lap seal, a butt-seal tape, a seal strip, or other seal configuration as known in the packaging arts connecting sheet first side to sheet second side to form contiguous second wall 114 (and contiguous first wall 112). Such various second seal configurations are further described in U.S. Pat. No. 7,627,839 (Busche et al.).

Package 110 further comprises perimeter 115 comprising first edge 116, second edge 118 opposing first edge 116, third edge 120 substantially perpendicular to first edge 116 and second edge 118, and fourth edge 122 opposing third edge 120.

In the embodiment of FIG. 3 considering the method of forming package 110 and the presence of second seal 180 in second wall 114, first edge 116 comprises either a fold between and connecting first wall 112 to second wall 114 or a gusset member formed or plowed in a fold between and connecting first wall 112 to second wall 114, second edge 118 comprises either a fold between and connecting first wall 112 to second wall 114 or a gusset member formed or plowed in a fold between and connecting first wall 112 to second wall 114, third edge 120 comprises either a third edge seal connecting first wall 112 to second wall 114 or a gusset member inserted and sealed between and connecting first wall 112 to second wall 114, and fourth edge 122 is adjacent first seal 150.

First wall 112 of package 110 (and originally sheet 60) comprises an exterior layer, an interior layer, and a peelable adhesive layer similar to those described above. As depicted in FIG. 3, the peelable adhesive layer comprises first void 138 138 (having first void first border 139a and first void second border 139b) and a peelable adhesive region (not depicted). First seal 150 connects first wall 112 to second wall 114, is adjacent fourth edge 122, and extends from first edge 116 to second edge 118. First seal 150 is positioned between first line of weakness 142 and second line of weakness 144, and first end portion 152 of first seal 150 is aligned with first void 138, partially overlaying first void 138. First void is aligned with or otherwise overlays first line of weakness 142. In contrast to package 10, in package 110, each of first line of weakness 142 and second line of weakness 144 is absent from each of first edge 116 and second edge 118 due to pattern, non-continuous scoring, perforating, or otherwise of the interior layer. As above, in FIG. 3 first void 138, first line of weakness 142, and second line of weakness 144 are depicted as dashed lines since each is internal to first wall 112 of package 110.

As depicted in FIG. 3, each of first line of weakness 142 and second line of weakness 144 is linear, and first line of weakness 142 is parallel to second line of weakness 144. FIGS. 5-11 are exemplary configurations of other configurations of a first line of weakness and a second line of weakness of various packages according to the present application and, as such, are non-limiting examples of such configurations. Unless otherwise apparent, any of the various lines of weakness configurations may be included in any of the various packaging configurations (e.g., horizontal-form-fill-seal package, vertical form-fill-seal package, lap-seal package, fin-seal package, quad-seal package, three-side-seal package, quad-pack, pouch, stand-up pouch, K-seal pouch, doyen-style pouch, side-gusset pouch, pillow pouch, stick pack, sachet, forming/non-forming package, thermoformed tray with lid, or other packaging configurations) described in the present application.

Figure 5:
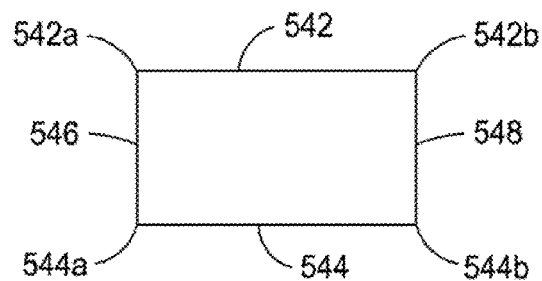
FIGS. 5-11 are exemplary configurations of other configurations of a first line of weakness and a second line of weakness of various packages according to the present application.

As depicted in FIG. 5, each of first line of weakness 542 (with first end 542a and second end 542b) and second line of weakness 544 (with first end 544a and second end 544b) is linear, and first line of weakness 542 is parallel to second line of weakness 544. Third line of weakness 548 connects first end 542a of first line of weakness 542 to first end 544a of second line of weakness 644, and fourth line of weakness 548 connects second end 542b of first line of weakness 542 to second end 544b of second line of weakness 544. In other embodiments (not depicted), third line of weakness connects the first line of weakness to the second line of weakness and fourth line of weakness connects the first line of weakness to the second line of weakness, and such connections are not necessarily at the first end and the second end of each of the lines of weakness. In some embodiments, fourth line of weakness may be omitted.

Figure 6:
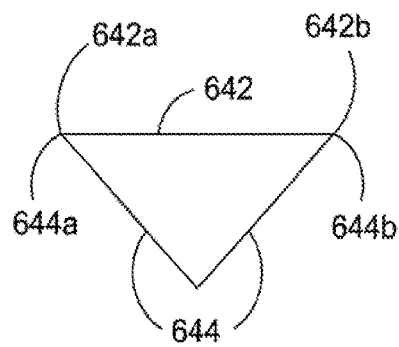

As depicted in FIG. 6, first line of weakness 642 (with first end 642a and second end 642b) is linear, and second line of weakness 644 (with first end 644a and second end 644b) is non-linear. First end 642a of first line of weakness 642 connects to first end 644a of second line of weakness 644, and second end 642b of first line of weakness 642 connects to second end 644b of second line of weakness 644. In other embodiments (not depicted), the first line of weakness and the second line of weakness may intersect at two points and not necessarily connect or terminate at the first end and the second end of each of the lines of weakness.

Figure 7:
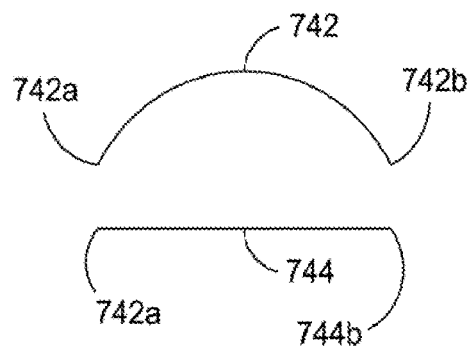

As depicted in FIG. 7, first line of first line of weakness 742 (with first end 742a and second end 742b) is non-linear, and second line of weakness 744 (with first end 744a and second end 744b) is linear. Similar to the configuration of FIG. 3, first end 742a of first line of weakness 742 does not connect to first end 744a of second line of weakness 744 (neither in and of themselves nor via a third line of weakness), and second end 742b of first line of weakness 742 does not connect to second end 744b of second line of weakness 744 (again, neither in and of themselves nor via a fourth line of weakness).

Figure 8:
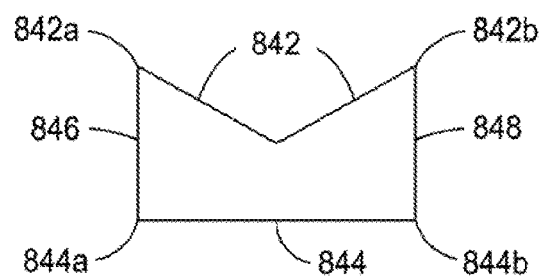

As depicted in FIG. 8, first line of weakness 842 (with first end 842a and second end 842b) is non-linear, and second line of weakness 844 (with first end 844a and second end 844b) is linear. Third line of weakness 846 connects first end 842a of first line of weakness 842 to first end 844a of second line of weakness 844, and fourth line of weakness 848 connects second end 842b of first line of weakness 842 to second end 844b of second line of weakness 844. In other embodiments (not depicted) third line of weakness connects the first line of weakness to the second line of weakness and fourth line of weakness connects the first line of weakness to the second line of weakness, and such connections are not necessarily at the first end and the second end of each of the lines of weakness. In some embodiments, fourth line of weakness may be omitted.

Figure 9:
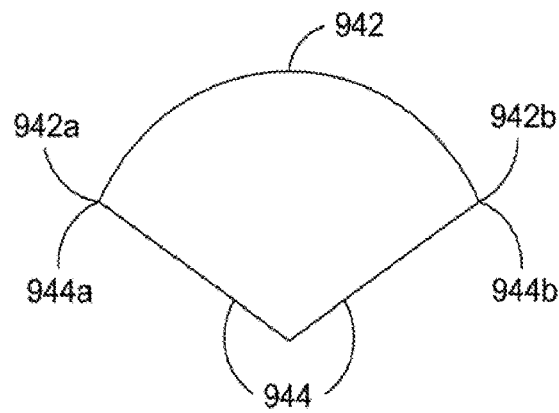

As depicted in FIG. 9, first line of weakness 942 (with first end 942a and second end 942b) is non-linear, and second line of weakness 944 (with first end 944a and second end 944b) is non-linear. First end 942a of first line of weakness 942 connects to first end 944a of second line of weakness 944, and second end 942b of first line of weakness 942 connects to second end 944b of second line of weakness 944. In other embodiments (not depicted), the first line of weakness and the second line of weakness may intersect at two points and not necessarily connect or terminate at the first end and the second end of each of the lines of weakness.

Figure 10:
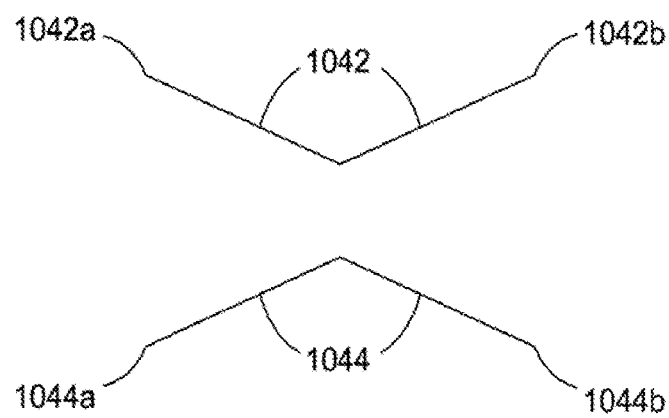

As depicted in FIG. 10, first line of first line of weakness 1042 (with first end 1042a and second end 1042b) is non-linear, and second line of weakness 1044 (with first end 1044a and second end 44b) is non-linear. Similar to the configurations of FIGS. 3 and 7, first end 1042a of first line of weakness 1042 does not connect to first end 1044a of second line of weakness 1044 (neither in and of themselves nor via a third line of weakness), and second end 1042b of first line of weakness 1042 does not connect to second end 1044b of second line of weakness 1044 (again, neither in and of themselves nor via a fourth line of weakness).

Figure 11:
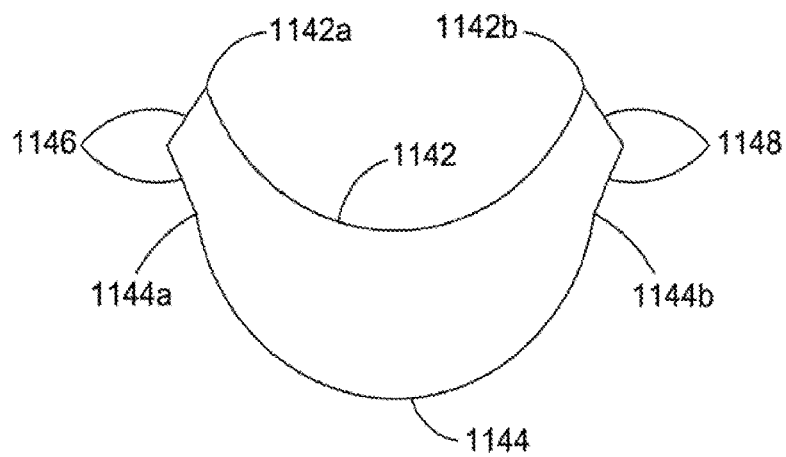

As depicted in FIG. 11, first line of weakness 1142 (with first end 1142a and second end 1142b) is non-linear, and second line of weakness 1144 (with first end 1144a and second end 1144b) is non-linear. Third line of weakness 1146 connects first end 1142a of first line of weakness 1142 to first end 1144a of second line of weakness 1144, and fourth line of weakness 1148 connects second end 1142b of first line of weakness 1142 to second end 1144b of second line of weakness 1144. In other embodiments (not depicted) third line of weakness connects the first line of weakness to the second line of weakness and fourth line of weakness connects the first line of weakness to the second line of weakness, and such connections are not necessarily at the first end and the second end of each of the lines of weakness. In some embodiments, fourth line of weakness may be omitted.

Figure 12:
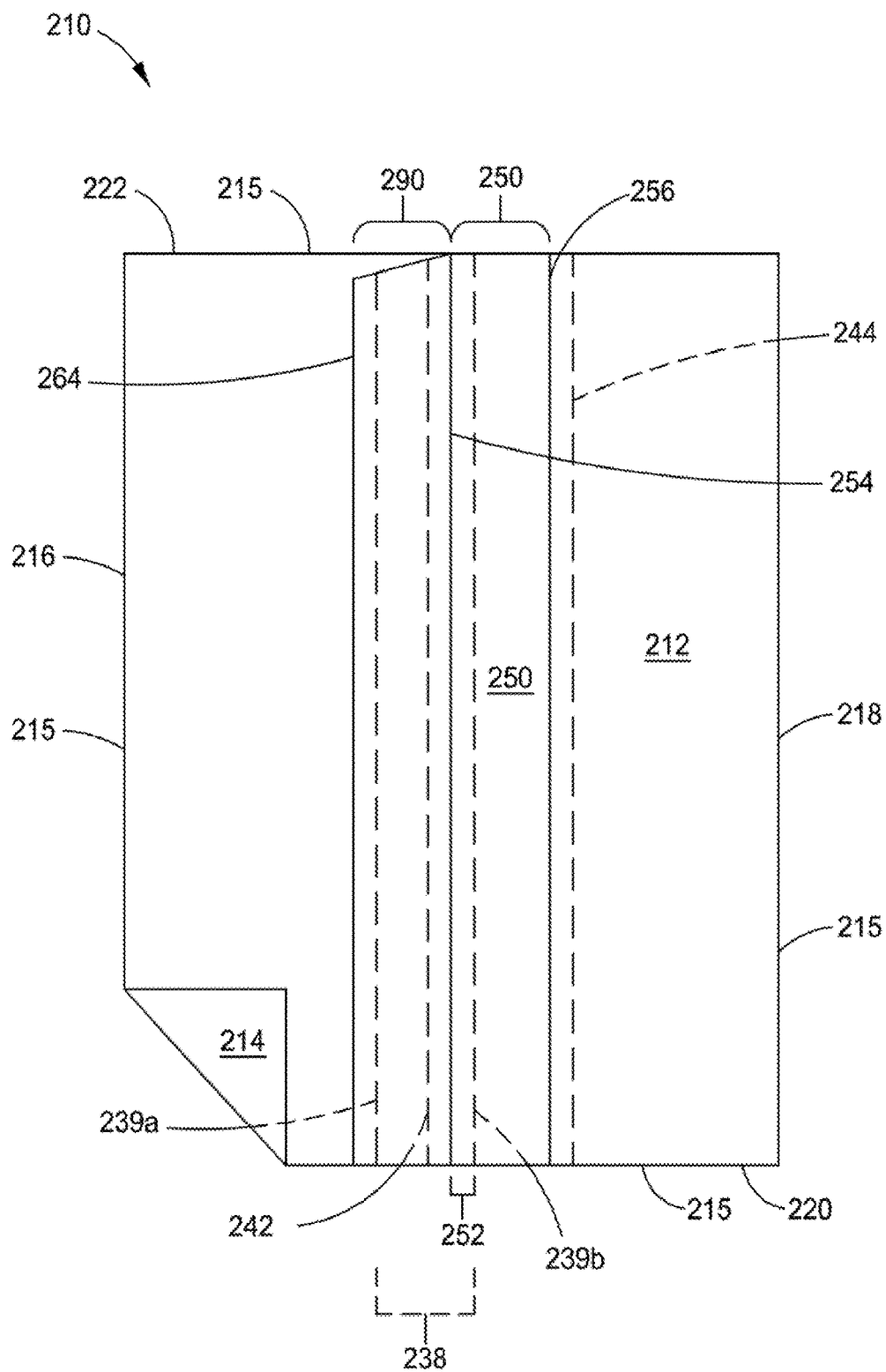
FIG. 12 is a schematic top view of a third embodiment of a package according to the present application.

FIG. 12 is a schematic top view of a third embodiment of a package according to the present application. Package 210 of FIG. 12 is similar to package 110 of FIG. 3 in that each of package 110 and package 210 is formed from a sheet, such as variations of sheet 60 of FIG. 4. However, package 210 is formed by connecting a sheet first side (not depicted) to sheet second side 264 to form first seal 250 (having first seal first border 254 and first seal second border 256) and contiguous first wall 212 (and contiguous second wall 214). FIG. 12 depicts first wall 212 facing out and second wall 214 facing in. First seal 250 of package 210 comprises a fin seal, a lap seal, a butt-seal tape, a seal strip, or other seal configuration as known in the packaging arts, connecting sheet first side to sheet second side 264 to form contiguous first wall 212 (and contiguous second wall 214). As described above, such various second seal configurations are further described in U.S. Pat. No. 7,527,839 (Busche et al.).

Package 210 further comprises perimeter 215 comprising first edge 216, second edge 218 opposing first edge 216, third edge 220 substantially perpendicular to first edge 216 and second edge 218, and fourth edge 222 opposing third edge 220.

In the embodiment of FIG. 12 considering the method of forming package 210 and the presence of first seal 250 in first wall 212, first edge 216 comprises either a fold between and connecting first wall 212 to second wall 214 or a gusset member formed or plowed in a fold between and connecting first wall 212 to second wall 214, second edge 218 comprises either a fold between and connecting first wall 212 to second wall 214 or a gusset member formed or plowed in a fold between and connecting first wall 212 to second wall 214, third edge 220 comprises either a third edge seal connecting first wall 212 to second wall 214 or a gusset member inserted and sealed between and connecting first wall 212 to second wall 214, and fourth edge 222 comprises either a fourth edge seal connecting first wall 212 to second wall 214 or a gusset member inserted and sealed between and connecting first wall 212 to second wall 214.

First wall 212 of package 210, including but not limited to the region of first seal 250 adjacent sheet second side 264, comprises an exterior layer, an interior layer, and a peelable adhesive layer similar to those described above. As depicted in FIG. 12, the peelable adhesive layer comprises first void 238 (having first void first border 239a and first void second border 239b) and a peelable adhesive region (not depicted). First seal 250 is positioned between first line of weakness 242 and second line of weakness 244, and first end portion 252 of first seal 250 is aligned with first void 238, partially overlaying first void 238. First void 238 is aligned with or otherwise overlays first line of weakness 242. As above, in FIG. 12 first void 238, first line of weakness 242, and second line of weakness 244 are depicted as dashed lines as each is internal to first wall 212 of package 210.

In some embodiments, first wall 212 of package 210 further comprises pull tab 290 in the region from sheet second side 264 to first seal first border 254. Pull tab 290 facilitates opening of package 210 at first seal 250.

Figure 13:
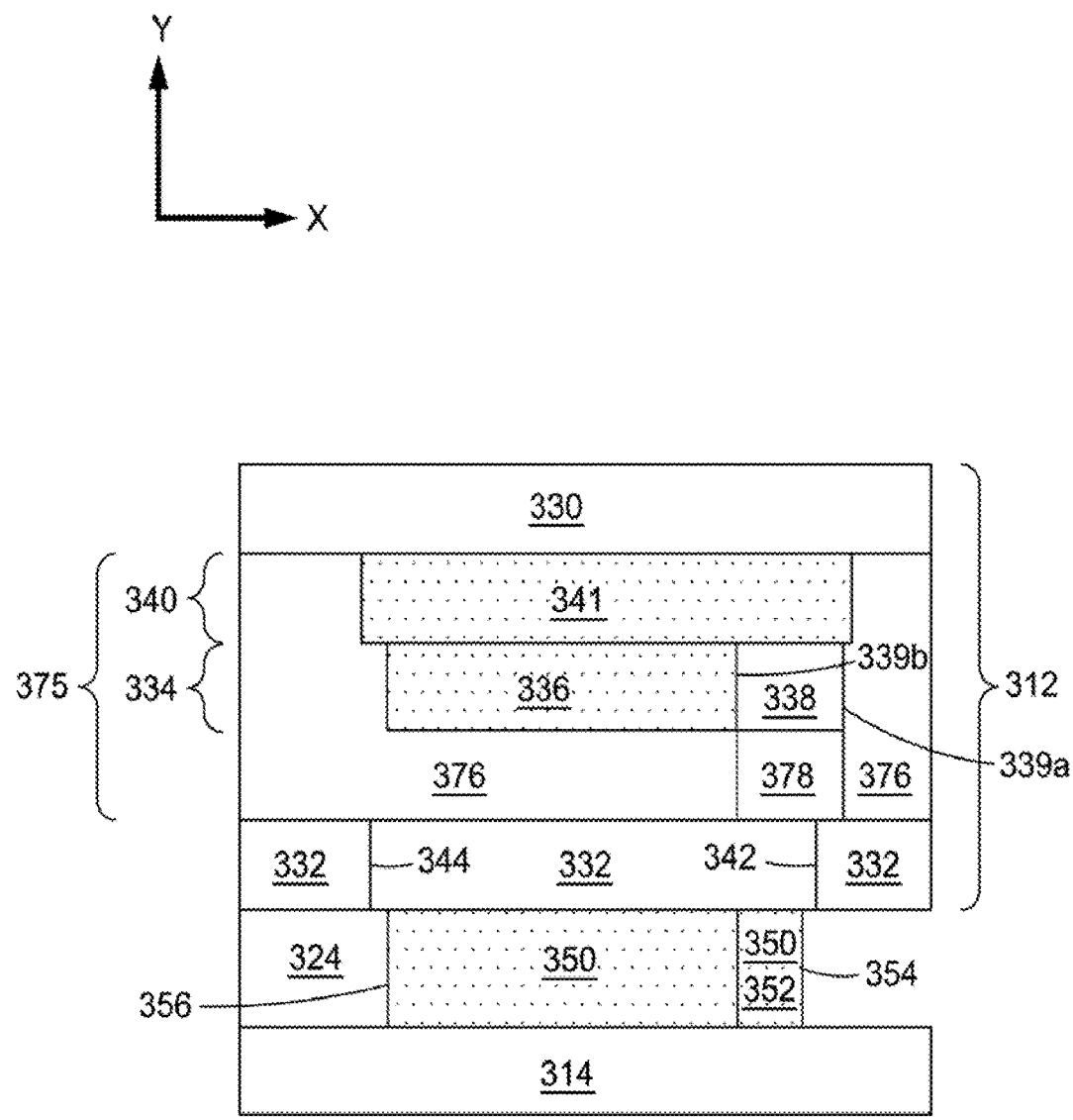
FIG. 13 is a second embodiment of a schematic cross-sectional view of a package according to the present application.

As described above and as depicted in FIG. 2, in various embodiments of the various packages described in the present application, first wall 12 comprises exterior layer 30, interior layer 32, and peelable adhesive layer 34 positioned between exterior layer 30 and interior layer 32. In other embodiments, the first wall may comprise additional layers. FIG. 13 is a second embodiment of a schematic cross-sectional view of a package according to the present application.

As depicted in FIG. 13, first wall 312 comprises exterior layer 330, interior layer 332, and peelable adhesive layer 334 positioned between exterior layer 330 and interior layer 332. Interior layer 332 comprises first line of weakness 342 and second line of weakness 344. Peelable adhesive layer 334 comprises peelable adhesive region 336 and first void 338 (having first void first border 339a and first void second border 339b). Exterior layer 330, interior layer 332, first line of weakness 342, second line of weakness 344, peelable adhesive layer 334, peelable adhesive region 336, and first void 338 are as described above for exterior layer 30, interior layer 32, first line of weakness 42, second line of weakness 44, peelable adhesive layer 34, peelable adhesive region 36, and first void 38, respectively.

First wall 312 further comprises release layer 340 comprising release agent region 341 positioned between exterior layer 330 and peelable adhesive layer 334 in a first direction (i.e., the y direction of FIG. 13) and positioned between first line of weakness 342 and second line of weakness 344 in a second direction (i.e., the "x" direction of FIG. 13). Release agent region 341 comprises a release agent. The release agent may be solvent-based or water based and may be silicone, release varnish, release lacquer, or any other release agent as known in the packaging arts. The release agent facilitates separation of peelable adhesive region 336 and exterior layer 330.

As depicted in FIG. 13, release layer 340 solely comprises release agent region 341, and release agent region is coextensive with the region between first line of weakness 342 and second line of weakness 344. As used throughout this application, the term "coextensive" refers to the width of one element being at least substantially equal to, and in some embodiments greater than, the width of another element. Region agent region 341 is also at least as wide (i.e., in an x-direction dimension in FIG. 13) as peelable adhesive region 336, and, as depicted in FIG. 13, in this embodiment is wider.

In some embodiments, the release layer (i.e., the release agent region) may be flood-coated between the exterior layer and the peelable adhesive layer. In other embodiments, the release agent region may be positioned between the first line of weakness and second line of weakness and not necessarily coextensive with the region between the two lines of weakness and, therefore, pattern-applied. In yet other pattern-applied embodiments, the release layer may comprise a void in addition to a release agent region. This void in the release layer may be similar to the first void described above. As used throughout this application, a "flood-coated" layer is a layer applied to the entire width between two other layers and a "pattern-applied" layer is a layer applied to a portion or portions of the width but not the entire width between two other layers.

As depicted in FIG. 13, first wall 312 also further comprises permanent adhesive layer 375 positioned between peelable adhesive layer 334 and interior layer 332. Permanent adhesive layer 375 comprises permanent adhesive region 376 and second void 378. In FIG. 13, each of release layer 340 and peelable adhesive layer 334 are pattern-applied. Therefore, permanent adhesive region 376 (particularly, permanent adhesive region 376 "flows" into the regions of first wall not occupied by release layer 340 and peelable adhesive layer 334.

Permanent adhesive region 376 comprises permanent adhesive. Permanent adhesive is a laminating adhesive which serves to permanently connect exterior layer 330 to interior layer 332. The permanent adhesive may be solvent-based or water-based and may be one of many permanent adhesives as known in the packaging arts. Non-limiting examples of permanent adhesives include formaldehyde-free, waterborne acrylic adhesives and PVdC emulsion, barrier-type adhesives.

Permanent adhesive layer 375 also comprises second void 378. Second void 378 is aligned with first void 338. In other words, second void 378 overlays first void 338. In the embodiment of FIG. 13, second void 378 and first void 338 are coextensive in that they have substantially similar widths.

In some embodiments, second void 378 comprises no material (e.g., a "blank" area). In other embodiments, second void 378 comprises a release agent (e.g., as further described above), a peelable adhesive, or other material with a lower bond strength or less affinity with release agent region 341 than permanent adhesive region 376. In yet other embodiments, second void 378 comprises any other materials facilitating an interruption of permanent adhesive layer 375 and a 'deadening' of second void 378 of permanent adhesive layer 375.

As depicted in FIG. 13, first seal 350 connects first wall 312 to second wall 314, separating produce space 324 from an external atmosphere. First seal 350 (having first seal first border 354 and first seal second border 356) is positioned between first line of weakness 342 and second line of weakness 344. First end portion 352 of first seal 350 is aligned with first void 338 and second void 378. With such alignment, first end portion 352 partially overlays first void 338 and second void 378. Additionally, each of first void 338 and second void 378 is aligned with first line of weakness 342. In other words, each of first void 338 and second void 378 overlays or is otherwise adjacent to or aligned with first line of weakness 342.

As above, in some embodiments, first seal 350 is adjacent the fourth edge of a package, the first edge comprises a first edge seal, (e.g., a heat seal connecting first wall 312 to second wall 314), the second edge comprises a second edge seal (e.g., a heat seal connecting first wall 312 to second wall 314), and the third edge comprises a fold between and connecting first wall 312 to second wall 314 or a gusset member formed or plowed in a fold between and connecting first wall 312 to second wall 314. In such embodiments, each of peelable adhesive region 336 and release agent region 341 may be absent from each of the first edge seal and the second edge seal to reduce the occurrence of edge seal failure or leakers.

Various methods for making the package described in the present application exist. A non-limiting example includes the following: A packaging film exterior layer and a packaging film interior layer are acquired or produced by means known in the packaging arts (such as, for example, blown film extrusion or co-extrusion, slot cast extrusion or co-extrusion, lamination, coating, etc.). The exterior layer is adhesive laminated to the interior layer. During lamination, lines of weakness are formed and (in some embodiments, such as that of FIG. 2) peelable adhesive or (in other embodiments, such as that of FIG. 13) release agent, peelable adhesive, and permanent adhesive are printed or otherwise applied to create the first wall structure described above. The first wall and the second wall (either as a separate material or as a further region of the packaging film) are connected to create a partially-sealed package. The product to be packaged is placed in the partially-sealed package, and the package is fully-sealed. In some embodiments, as a further non-limiting example, if the packaging film is used for both the first wall and the second wall, a third edge is formed by folding the packaging film, and a first edge seal and a second edge seal is formed to create a package that is open at the fourth edge. The product to be packaged is placed in the partially-sealed package, and the first seal is made at the fourth edge to form a fully-sealed package.

Figure 14A:
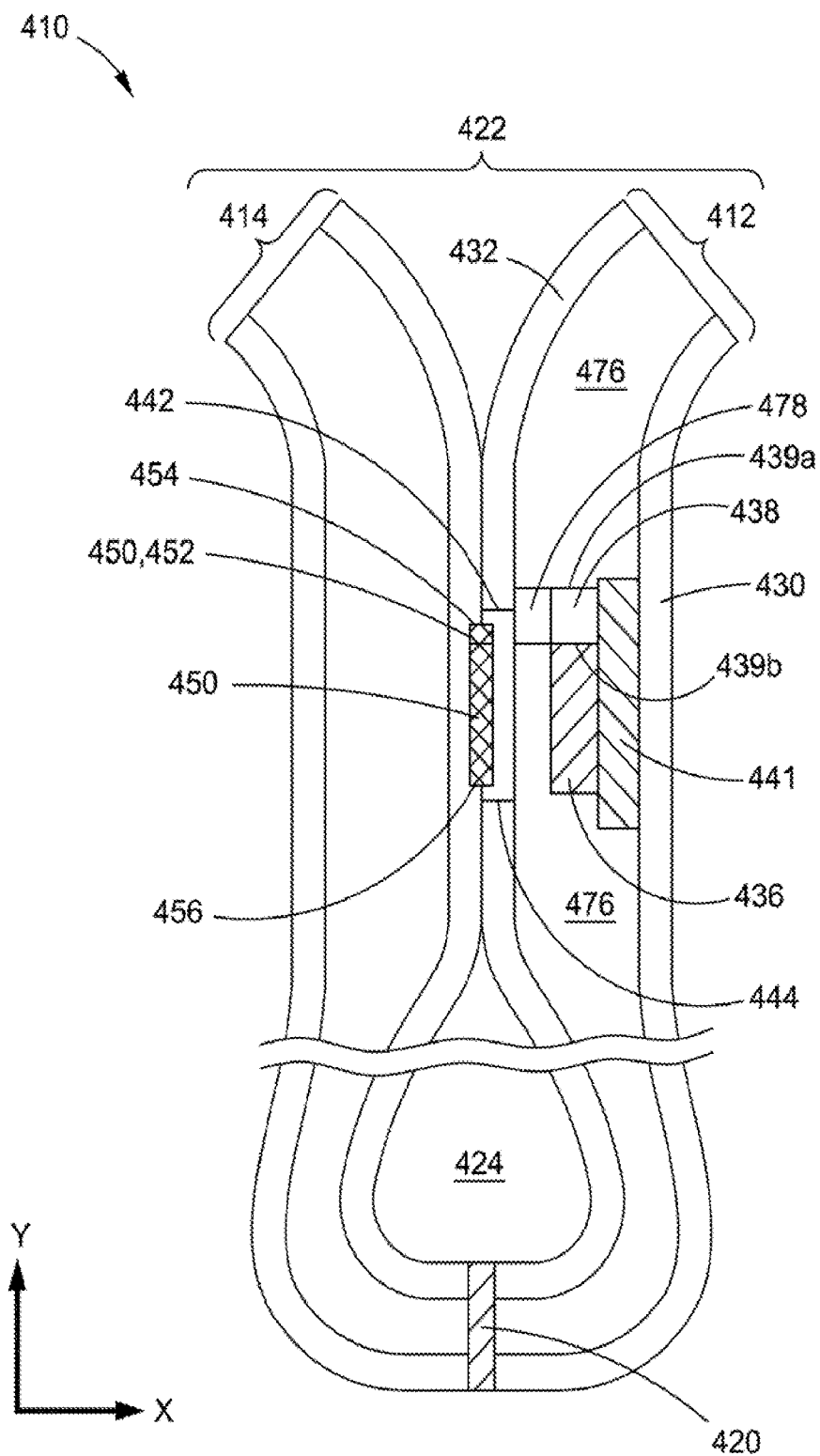
FIG. 14 (with FIGS. 14A, 14B and 14C) is a third embodiment of a schematic cross-sectional view of a package according to the present application.
Figure 14B:
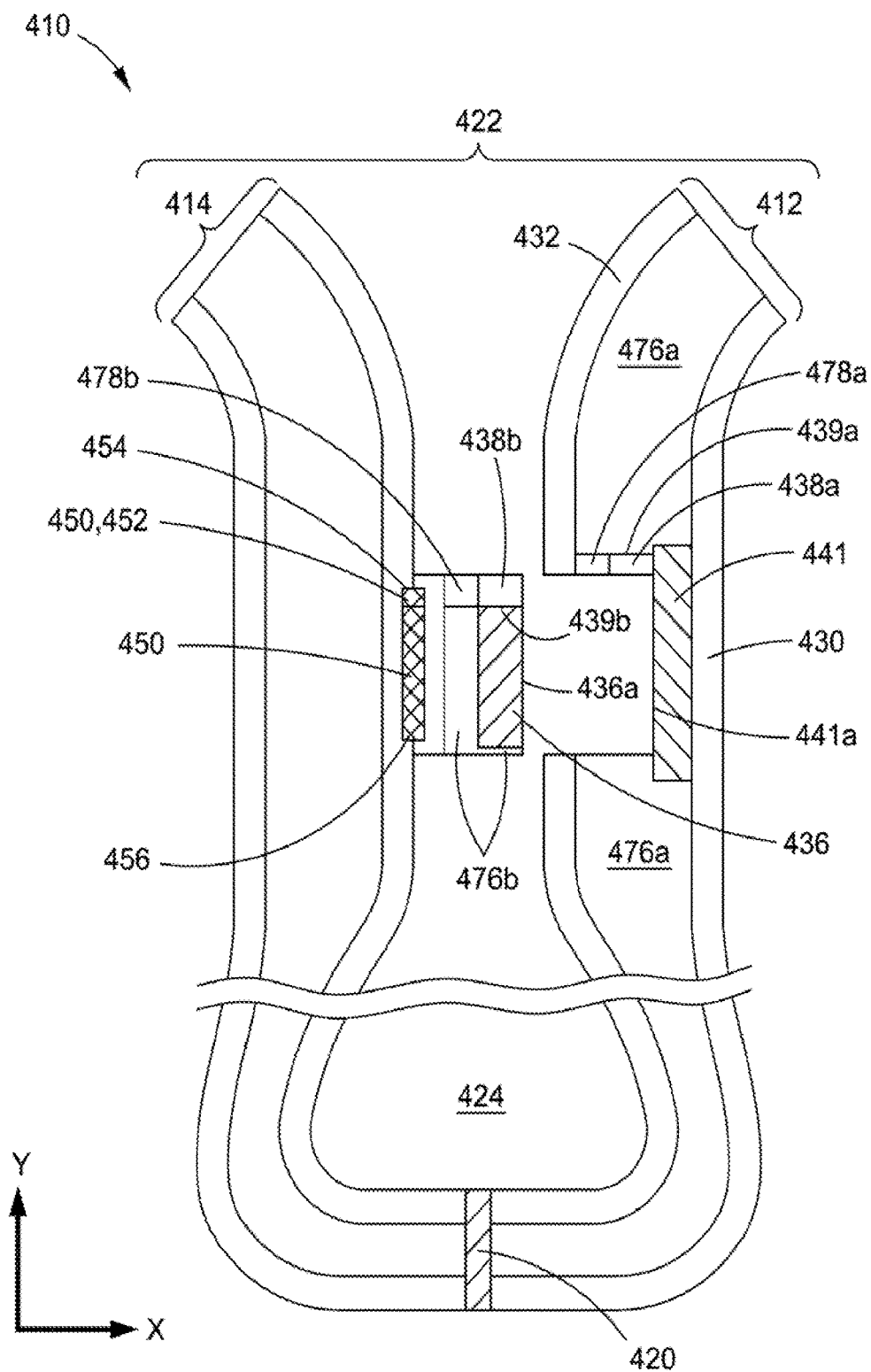
Figure 14C:
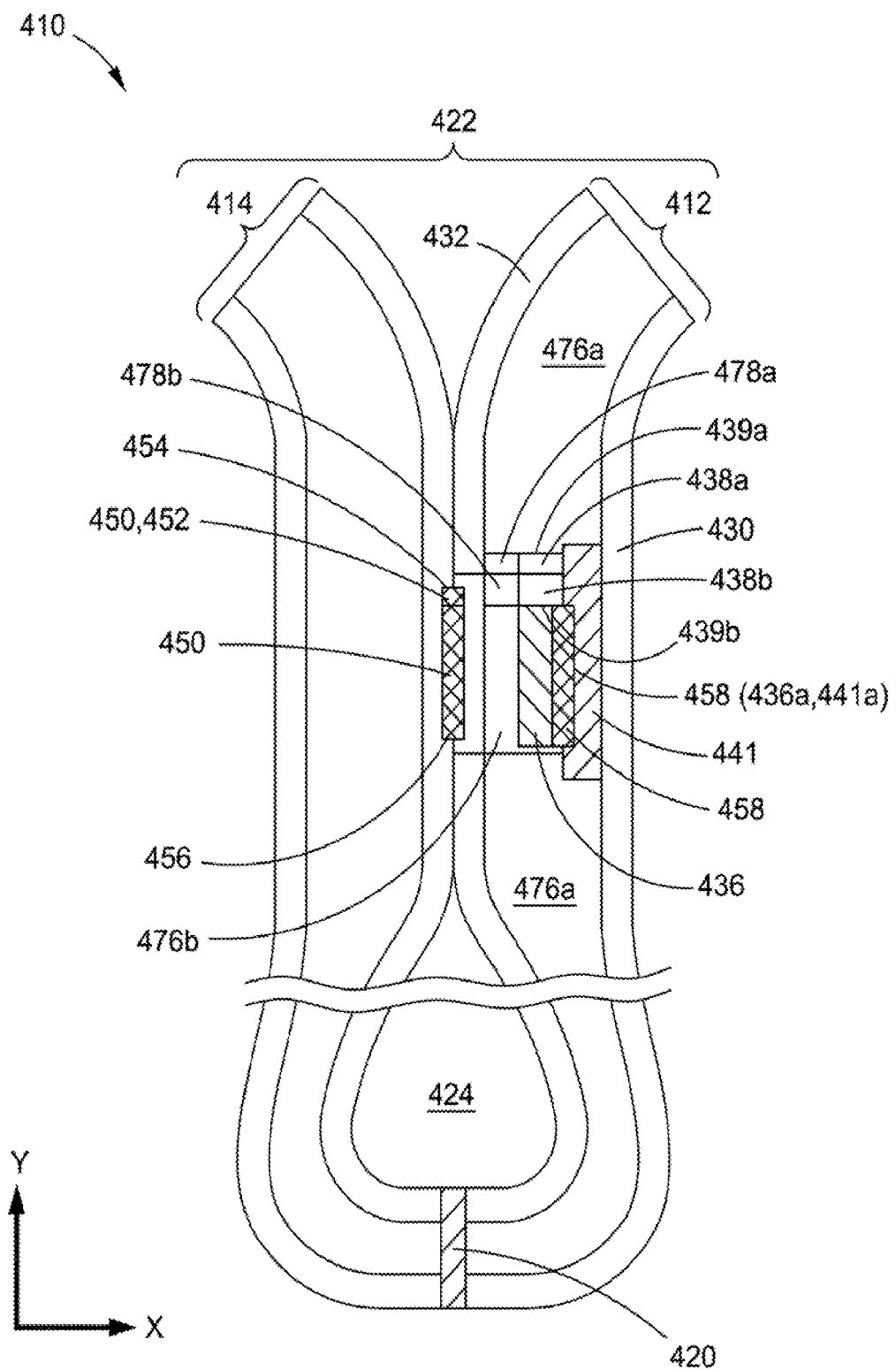

In some embodiments, the fully-sealed package may be similar to that depicted in FIG. 14. FIG. 14 (with FIGS. 14A, 14B, and 14C) is a third embodiment of a schematic cross-sectional view of a package according to the present application. FIGS. 14A, 14B, and 14C illustrate the use and operation of package 410.

Package 410 is a specific embodiment of package 10 of FIG. 1 in which the first edge (not depicted) comprises a first edge seal connecting first wall 412 to second wall 414, the second edge (not depicted) comprises a second edge seal connecting first wall 412 to second wall 414, third edge 420 comprises a fold between and connecting first wall 412 to second wall 414, and fourth edge 422 comprises or is otherwise adjacent first seal 450, with first seal 450 extending from the first edge to the second edge. Package 410 comprises first wall 412 having a structure/cross-section similar to that of FIG. 13. First wall 412 and second wall 414 each comprises exterior layer 430 and interior layer 432. First wall 412 also comprises a peelable adhesive layer (comprising peelable adhesive region 436 and first void 438) positioned between exterior layer 430 and interior layer 432. First wall 412 further comprises a release layer (comprising release agent region 441) positioned between exterior layer 430 and the peelable adhesive layer in a first direction (i.e., the x direction of FIG. 14) and positioned between (and, in this embodiment, coextensive with and covering at least the region between) first line of weakness 442 (in interior layer 432) and second line of weakness 444 (in interior layer 432) in a second direction (i.e., the y direction of FIG. 14). Release agent region 441 is also at least as wide (i.e., in a y-direction dimension in FIG. 14) as peelable adhesive region 436, and, as depicted in FIG. 14, in this embodiment is wider. First wall 412 also further comprises a permanent adhesive layer (comprising permanent adhesive region 476 and second void 478) positioned between the peelable adhesive layer and interior layer 432. While not depicted in FIG. 14, in this embodiment, each of peelable adhesive region 436 and release agent region 441 is absent from each of the first edge seal and the second edge seal.

In FIG. 14, second void 478 is aligned with first void 438 (having first void first border 439a and first void second border 439b). In other words, second void 478 overlays first void 438. In the embodiment of FIG. 14, second void 478 and first void 438 are coextensive in that they have substantially similar widths. Each of first line of weakness 442 and second line of weakness 444 is linear, and first line of weakness 442 is parallel to second line of weakness 444. In some embodiments, each of first line of weakness 442 and second line of weakness 444 may comprise a continuous series of perforations.

FIG. 14A illustrates package 410 in an initially closed position, i.e., with first seal 450 connecting first wall 412 to second wall 414 to fully-seal package 410 and fully-enclose product space 424. First seal 450 (having first seal first border 454 and first seal second border 456) is positioned between first line of weakness 442 and second line of weakness 444. Placement of first seal 450 is such that neither first line of weakness 442 nor second line of weakness 444 is destroyed or otherwise damaged as a result of first seal 450. First end portion 452 of first seal 450 is aligned with first void 438 and second void 478. With such alignment, first end portion 452 partially overlays first void 438 and second void 478. Additionally, each of first void 438 and second void 478 is aligned with first line of weakness 442. In other words, each of first void 438 and second void 478 overlays or is otherwise adjacent to or aligned with first line of weakness 442. In some embodiments, first seal first border 452 may be positioned a distance of from 0 to 12.7 millimeters (i.e., 0 to 0.50 inches) or from 0 to 6.35 millimeters (i.e., 0 to 0.25 inches) or from 0 to 3.18 millimeters (i.e., 0 to 0.125 inches) from first line of weakness 442.

FIG. 14B illustrates package 410 in an open position. When an end-user wishes to access product packaged in product space 424, the end-user may grasp the unsealed portions of first wall 412 and second wall 414 adjacent fourth edge 422 and pull first wall 412 in a direction opposite second wall 414 (i.e., peel apart first wall 412 and second wall 414 at first seal 450). This creates an open position where first wall 412 is further separated from second wall 414. In such open position, release agent exposed section 441a is created on release agent region 441 and peelable adhesive exposed section 438a is created on peelable adhesive region 436. Such open position also divides first void 438 into first void first part 438a and first void 438b and divides second void 478 into second void first part 478a and second void second part 478b. The dividing line between the first part and the second part of each first void 438 and second void 478 is the region adjacent the former (and now "removed" or "broken open") first line of weakness. Such open position also divides permanent adhesive region 478 into permanent adhesive region first part 476a and permanent adhesive region second part 476b.

The newly created dividing line between permanent adhesive region first part 476a and permanent adhesive region second part 476b is the region adjacent the former (and now "removed" or "broken open") second line of weakness.

After an end-user opens package 410 and removes a portion of the product packaged in product space 424, the end-user may reclose or reseal package 410 by moving first wall 412 and second wall 414 toward one another and pressing peelable adhesive exposed section 436a of peelable adhesive region 436 onto release agent exposed section 441a of release agent region 441 to created reclose seal 458. This creates a "reclosed" or "resealed" position. As depicted in FIG. 14, reclose seal 458 comprises peelable adhesive exposed section 436a and release agent exposed section 441a. As such package 410 is peelable and resealable. The "reclosed"/"resealed" position also reforms first void 438 (albeit still comprising first void first part 438a and first void second part 438b), reforms second void 478 (albeit still comprising second void first part 478a and second void second part 478b), and reforms permanent adhesive region 476 (albeit still comprising permanent adhesive region first part 476a and permanent adhesive region second part 476b). Since the "reclosing"/"resealing" of package 410 does not close or otherwise reconstruct first wall 412 at the dividing lines described above (i.e., the former first line of weakness and the former second line of weakness), the first and second parts of each first void 438, second void 478, and permanent adhesive region 476 still exist.

In the embodiment of FIG. 14C, upon reclose, the area of interior layer 432 between first seal second border 456 and the region adjacent the former (and now "removed" or "broken open") second line of weakness is unsealed or otherwise unattached, and this unattached area forms a skirt. It reclosed package 410 is inverted, product in product space 424 may push against such skirt and not against reclose seal 458, contributing to reseal package integrity.

EXAMPLES

To further exemplify the various embodiments of the present application, several example and comparative example first walls and packages were produced and evaluated for various properties.

First Wall Example 1—A 23-micron (i.e., 92-gauge) thick exterior layer comprising corona-treated OPET was printed with a flood-coated ink, a pattern-applied release agent, and a pattern-applied peelable adhesive. The release agent and peelable adhesive were pattern-applied via printing in a pattern similar to FIG. 13 (e.g., including a first void). A 51-micron (i.e., 2.0 mil) thick interior layer comprising a corona-treated first layer comprising a blend of VLDPE and LLDPE, a second layer comprising tie material, a third layer comprising EVOH, a fourth layer comprising tie material, a fifth layer comprising a blend of VLDPE and LLDPE, and a sealant layer comprising EVA was scored (i.e., continuously cut) to create a first line of weakness and a second line of weakness in a pattern similar to FIG. 13 and then laminated to the printed OPET. To laminate, permanent adhesive was applied in a pattern similar to FIG. 13 (e.g., including a second void).

First Wall Example 2—A 23-micron (i.e., 92-gauge) thick exterior layer comprising corona-treated OPET was printed with a flood-coated ink, a pattern-applied release agent, and a pattern-applied peelable adhesive. The release agent and peelable adhesive were pattern-applied via printing in a pattern similar to FIG. 13 (e.g., including a first void). A 38-micron (i.e., 1.5 mil) thick interior layer comprising a corona-treated first layer comprising a blend of LLDPE and LDPE and a sealant layer comprising a blend of LLDPE and LDPE was scored (i.e., continuously cut) to create a first line of weakness and a second line of weakness in a pattern similar to FIG. 13 and then laminated to the printed OPET. To laminate, permanent adhesive was applied in a pattern similar to FIG. 13 (e.g., including a second void).

First Wall Example 3—A 23-micron (i.e., 92-gauge) thick exterior layer comprising corona-treated OPET was printed with a flood-coated ink layer, a pattern-applied release agent, and a pattern-applied peelable adhesive. The release agent and peelable adhesive were pattern-applied via printing in a pattern similar to FIG. 13 (e.g., including a first void). A 64-micron (i.e., 2.5 mil) thick interior layer comprising a corona-treated first layer comprising a blend of LLDPE and LDPE, a second layer comprising tie material, a third layer comprising EVOH, a fourth layer comprising tie material, a fifth layer comprising a blend of LLDPE and LDPE, and a sealant layer comprising a blend of mLLDPE and LDPE was laser perforated to create a first line of weakness and a second line of weakness in a pattern similar to FIG. 13 and then laminated to the printed OPET. To laminate, permanent adhesive was applied in a pattern similar to FIG. 13 (e.g., including a second void).

First Wall Example 4—A 23-micron (i.e., 92-gauge) thick exterior layer comprising corona-treated OPET was printed with a flood-coated ink layer, a pattern-applied release agent, and a pattern-applied peelable adhesive. The release agent and peelable adhesive were pattern-applied via printing in a pattern similar to FIG. 13 (e.g., including a first void). A 51-micron (i.e., 2.0 mil) thick interior layer comprising a corona-treated first layer comprising a blend of VLDPE and LLDPE, a second layer comprising tie material, a third layer comprising EVOH, a fourth layer comprising tie material, a fifth layer comprising a blend of VLDPE and LLDPE, and a sealant layer comprising EVA was mechanically perforated to create a first line of weakness and a second line of weakness in a pattern similar to FIG. 13 and then laminated to the printed OPET. To laminate, permanent adhesive was applied in a pattern similar to FIG. 13 (e.g., including a second void).

First Wall Comparative Example 1—A 23-micron (i.e., 92-gauge) thick exterior layer comprising corona-treated OPET was printed with a flood-coated ink layer, a pattern-applied release agent, and a pattern-applied peelable adhesive. The release agent and peelable adhesive were pattern-applied via printing in a pattern generally similar to FIG. 13 but not including a separate, distinct first void in the peelable adhesive layer. A 63-micron (i.e., 2.5 mil) thick interior layer comprising a corona-treated first layer comprising a blend of LDPE and LLDPE, a second layer comprising tie material, a third layer comprising EVOH, a fourth layer comprising tie material, and a sealant layer comprising a blend of LLDPE and LDPE was scored (i.e., continuously cut) to create a first line of weakness and a second line of weakness in a pattern generally similar to FIG. 13 and then laminated to the printed OPET. To laminate, permanent adhesive was flood-coated, i.e., not applied in a pattern similar to FIG. 13, not including a second void.

Package Example 1—Package Example 1 was formed with First Wall Example 1 and a second wall. The second wall comprised a 23-micron (i.e., 92-gauge) thick exterior layer comprising corona-treated OPET laminated via flood-coated permanent adhesive to a 51-micron (i.e., 2.0 mil) thick interior layer comprising a corona-treated first layer comprising a blend of VLDPE and LLDPE, a second layer comprising tie material, a third layer comprising EVOH, a fourth layer comprising tie material, a fifth layer comprising a blend of VLDPE and LLDPE, and a sealant layer comprising EVA. Package Example 1 included a first edge seal, a second edge seal, and a third edge fold. A first seal connected the first wall and the second wall adjacent the fourth edge between the first line of weakness and the second line of weakness.

Package Comparative Example 1—Package Comparative Example 1 was formed with First Wall Comparative Example 1 and a second wall. The second wall comprised a 23-micron (i.e., 92-gauge) thick exterior layer comprising corona-treated OPET laminated via flood-coated permanent adhesive to a 63-micron (i.e., 2.5 mil) thick interior layer comprising a corona-treated first layer comprising a blend of LDPE and LLDPE, a second layer comprising tie material, a third layer comprising EVOH, a fourth layer comprising tie material, and a sealant layer comprising a blend of LLDPE and LDPE. Package Comparative Example 1 included a first edge seal, a second edge seal, and a third edge fold. A first seal connected the first wall and the second wall adjacent the fourth edge between the first line of weakness and the second line of weakness.

For each of Package Example and Package Comparative Example 1, the first seal was placed at varying distances from the first line of weakness, and the package was evaluated for initial opening force at the varying distances. Initial opening force is a measure of the force required to initially open a package. The initial opening force correlates to the strength of the seal at the opening initiation point. The opening forces reported in the present application are expressed in gram force and are measured in accordance with ASTM F88, "Standard Test Method for Seal Strength of Flexible Barrier Materials," with 2.54 centimeter (i.e. one-inch) strips pulled at 30.5 centimeters (i.e., 12 inches) per minute to 3.8 centimeters (i.e., 1.5 inches) length. TABLE 1 reports the initial opening forces at the varying distances. (Five samples were averaged for each data point.

TABLE 1

| | First seal first border distance from first line of weakness (millimeters (inches)) | Initial Opening Force (grams force) | Observations |
|---|---|---|---|
| Package Example 1 | 0 | 715 | smooth peel |
| | 1.59 (0.0625) | 746.4 | smooth peel |
| | 3.18 (0.125) | 729 | smooth peel |
| | 6.35 (0.25) | 719 | smooth peel |
| Package Comparative Example 1 | 0 | 744 | initial peel was clean and effortless |
| | 1.59 (0.0625) | 4174 | interior layer stretched |
| | 3.18 (0.125) | 4136 | interior layer tore |
| | 6.35 (0.25) | 4178 | interior layer tore |

The initial opening forces for Package Example 1 and Package Comparative Example 1 were substantially similar when the first seal was touching the first line of weakness. When the first seal was positioned at varying distances from the first line of weakness, the initial opening force for Package Example 1 did not significantly change and the package remained relatively easy to open, due to the voids in the peelable adhesive and the permanent adhesive of the first wall of Package Example 1. However, without the voids in the peelable adhesive and the permanent adhesive of the first wall of Package Comparative Example 1, when the first seal was positioned a distance from the first line of weakness (and not touching the first line of weakness), the initial opening force for Package Comparative Example 1 significantly increased and the package became difficult to open. In some instances, stretching or tearing or other damage to the package resulted.

Each and every document cited in this present application, including any cross-referenced or related patent or application, is incorporated in this present application in its entirety by this reference, unless expressly excluded or otherwise limited. The citation of any document is not an admission that it is prior art with respect to any embodiment disclosed or claimed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application (including the appended claims) governs.

Unless otherwise indicated, all numbers expressing sizes, amounts, ranges, limits, and physical and other properties used in the present application (including the appended claims) are to be understood as being preceded in all instances by the term "about". Accordingly, unless expressly indicated to the contrary, the numerical parameters set forth in the present application (including the appended claims) are approximations that can vary depending on the desired properties sought to be obtained by a person of ordinary skill in the packaging arts without undue experimentation using the teachings disclosed in the present application.

As used in the present application (including the appended claims), the singular forms "a," "an," and "the" encompass embodiments having plural referents, unless the context clearly dictates otherwise. As used in the present application (including the appended claims), the term "or" is generally employed in its sense including "and/or," unless the context clearly dictates otherwise.

Spatially related terms, including but not limited to, "lower," "upper," "beneath," "below," "above," "bottom," and "top," if used in the present application (including the appending claims), are used for ease of description to describe spatial relationships of element(s) to another. Such spatially related terms encompass different orientations of the package in use or operation, in addition to the particular orientations depicted in the drawings and described in the present application (including the appended claims). For example, if an object depicted in the drawings is turned over or flipped over or inverted, elements previously described as below or beneath other elements would then be above those other elements.

The description, examples, embodiments, and drawings disclosed are illustrative only and should not be interpreted as limiting. The present invention includes the description, examples, embodiments, and drawings disclosed; but it is not limited to such description, examples, embodiments, or drawings. The reader should assume that features of one disclosed embodiment can also be applied to all other disclosed embodiments, unless expressly indicated to the contrary. Modifications and other embodiments will be apparent to a person of ordinary skill in the packaging arts, and all such modifications and other embodiments are intended and deemed to be within the scope of the present invention as described in the claims.

What is claimed is as follows:

1. A package comprising a first wall, a second wall, a first seal, a first edge, a second edge opposing the first edge, a third edge substantially perpendicular to the first edge and the second edge, and a fourth edge opposing the third edge,
    wherein the first wall comprises an exterior layer, an interior layer, and a peelable adhesive layer positioned between the exterior layer and the interior layer,
        wherein the interior layer comprises a first line of weakness and a second line of weakness, and
        wherein the peelable adhesive layer comprises a peelable adhesive region and a first void, the first void comprising a first void first border and a first void second border, both the first void first border and the first void second border adjacent to the peelable adhesive region; and
    wherein the first void is aligned with the first line of weakness;
    wherein the first seal connects the first wall to the second wall, is adjacent the fourth edge, and extends from the first edge to the second edge;
    wherein the first edge comprises a first edge seal, the second edge comprises a second edge seal, the third edge comprises a fold or a formed gusset, and the peelable adhesive region is absent from each of the first edge seal and the second edge seal; and
    wherein the first seal is positioned between the first line of weakness and the second line of weakness and a first end portion of the first seal is aligned with the first void.

2. The package of claim 1 wherein each of the first line of weakness and the second line of weakness is linear and the first line of weakness is parallel to the second line of weakness.

3. The package of claim 1 wherein the first seal comprises a first border and a second border, and the first border is positioned a distance of from 0 to 6.35 millimeters from the first line of weakness.

4. The package of claim 1 wherein each of the first line of weakness and the second line of weakness comprises a continuous series of perforations.

5. The package of claim 1 wherein the first wall and the second wall are formed from a sheet having a sheet first side and an opposing sheet second side and wherein the first seal comprises a fin seal, a lap seal, a butt-seal tape, or a seal strip, connects the sheet first side to the sheet second side, and extends from the third edge to the fourth edge.

6. The package of claim 5 wherein the first edge comprises a fold or formed gusset, the second edge comprises a fold or formed gusset, the third edge comprises a third edge seal or an inserted gusset, and the fourth edge comprises a fourth edge seal or an inserted gusset.

7. The package of claim 1 wherein the first wall further comprises (a) a release layer comprising a release agent region positioned between the exterior layer and the peelable adhesive layer and positioned between the first line of weakness and the second line of weakness and (b) a permanent adhesive layer positioned between the peelable adhesive layer and the interior layer and comprising a permanent adhesive region and a second void, wherein the second void is aligned with the first void and the first line of weakness and the first end portion of the first seal is aligned with the first void and the second void.

8. The package of claim 7, wherein the release agent region is coextensive with a region between the first line of weakness and the second line of weakness.

9. The package of claim 7, wherein the release agent region is at least as wide as the peelable adhesive region.

10. The package of claim 7 wherein the package further comprises a first edge, a second edge opposing the first edge, a third edge substantially perpendicular to the first edge and the second edge, and a fourth edge opposing the third edge; the first seal connects the first wall to the second wall and is adjacent the fourth edge; the first edge comprises a first edge seal, the second edge comprises a second edge seal, and the third edge comprises a fold or a formed gusset; and each of the peelable adhesive region and the release agent region is absent from each of the first edge seal and the second edge seal.

11. A package comprising a first wall, a second wall, and a first seal,
    wherein the first wall comprises an exterior layer, an interior layer, and a peelable adhesive layer positioned between the exterior layer and the interior layer,
    wherein the interior layer comprises a first line of weakness and a second line of weakness, and
    wherein the peelable adhesive layer comprises a peelable adhesive region and a first void, the first void comprising a first void first border and a first void second border, both the first void first border and the first void second border adjacent to the peelable adhesive region;
    wherein the first void is aligned with the first line of weakness;
    wherein the first seal is positioned between the first line of weakness and the second line of weakness and a first end portion of the first seal is aligned with the first void; and wherein the first wall and the second wall are formed from a sheet having a sheet first side and an opposing sheet second side, a second seal comprising a fin seal, a lap seal, a butt-seal tape, or a seal strip connects the sheet first side to the sheet second side, the first edge comprises a fold or a formed gusset, the second edge comprises a fold or a formed gusset, the third edge comprises a third edge seal or an inserted gusset, and each of the first line of weakness and the second line of weakness is absent from each of the first edge and the second edge.

12. The package of claim 11 wherein at least one of the first line of weakness and the second line of weakness is non-linear.

13. The package of claim 11 wherein each of the first line of weakness and the second line of weakness is linear and the first line of weakness is parallel to the second line of weakness.

14. The package of claim 13 wherein a third line of weakness connects the first line of weakness to the second line of weakness and a fourth line of weakness connects the first line of weakness to the second line of weakness.

15. A package comprising a first wall, a second wall, a first edge seal, a second edge seal opposing the first edge, a third edge fold substantially perpendicular to the first edge and the second edge, a fourth edge opposing the third edge fold, and a first seal,
wherein the first wall comprises an exterior layer, an interior layer, a peelable adhesive layer positioned between the exterior layer and the interior layer, a release layer comprising a release agent region positioned between the exterior layer and the peelable adhesive layer, and a permanent adhesive layer positioned between the peelable adhesive layer and the interior layer,
wherein the interior layer comprises a first line of weakness and a second line of weakness, wherein each of the first line of weakness and the second line of weakness is linear and the first line of weakness is parallel to the second line of weakness,
wherein the peelable adhesive layer comprises a peelable adhesive region and a first void,
wherein the release agent region is positioned between the first line of weakness and the second line of weakness and is coextensive with a region between the first line of weakness and the second line of weakness, and
wherein the permanent adhesive layer comprises a permanent adhesive region and a second void, wherein the second void is aligned with the first void; and
wherein each of the first void and the second void is aligned with the first line of weakness; and
wherein the first seal connects the first wall to the second wall, is adjacent the fourth edge, extends from the first edge to the second edge, and is positioned between the first line of weakness and the second line of weakness with a first end portion of the first seal aligned with the first void and the second void; and
wherein the release agent region is at least as wide as the peelable adhesive region, and each of the peelable adhesive region and the release agent region is absent from each of the first edge seal and the second edge seal.

16. The package of claim 15 wherein the first seal comprises a first border and a second border, and the first border is positioned a distance of from 0 to 6.35 millimeters from the first line of weakness.

17. The package of claim 15 wherein each of the first line of weakness and the second line of weakness comprises a continuous series of perforations.

* * * * *